(12) United States Patent
Grubka et al.

(10) Patent No.: US 9,097,020 B2
(45) Date of Patent: Aug. 4, 2015

(54) HIP AND RIDGE ROOFING SHINGLE

(75) Inventors: Lawrence J. Grubka, Westerville, OH (US); John A. Thies, III, Eden Prairie, MN (US); Mike J. Kuklock, Cedar, MN (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 0 days.

(21) Appl. No.: 12/717,519

(22) Filed: Mar. 4, 2010

(65) Prior Publication Data

US 2011/0214378 A1     Sep. 8, 2011

(51) Int. Cl.
*E04D 1/28* (2006.01)
*E04D 3/36* (2006.01)
*E04D 1/00* (2006.01)
*E04D 1/30* (2006.01)
*E04D 1/34* (2006.01)
*B23P 11/00* (2006.01)

(52) U.S. Cl.
CPC .. *E04D 3/36* (2013.01); *E04D 1/30* (2013.01); *B23P 11/00* (2013.01); *E04D 2001/005* (2013.01); *E04D 2001/305* (2013.01); *E04D 2001/3491* (2013.01); *Y10T 29/49826* (2015.01)

(58) Field of Classification Search
CPC ................... E04D 2001/005; E04D 2001/305; E04D 2001/3491; B32B 3/00
USPC ............. 52/98, 518, 557, 540, 553, 527, 535, 52/528, 554, 748.1, DIG. 16, 559; 156/71; 428/143, 124, 126; D25/139
See application file for complete search history.

(56) References Cited

U.S. PATENT DOCUMENTS

| | | | |
|---|---|---|---|
| D48,172 S | 11/1915 | Dun Lany | |
| 1,495,070 A | 5/1924 | Finley | |
| 1,516,243 A | 11/1924 | Perry | |
| 1,549,723 A | 8/1925 | Mattison | |
| 1,583,563 A | 5/1926 | Abraham | |
| 1,597,135 A * | 8/1926 | Wittenberg | ...................... 52/559 |
| 1,601,731 A | 10/1926 | Flood | |

(Continued)

FOREIGN PATENT DOCUMENTS

| | | |
|---|---|---|
| CA | 1207975 | 7/1986 |
| CN | 2176391 | 9/1994 |

(Continued)

OTHER PUBLICATIONS

Office action from U.S. Appl. No. 13/193,864 dated Nov. 4, 2013.

(Continued)

*Primary Examiner* — Brian Glessner
*Assistant Examiner* — Babajide Demuren
(74) *Attorney, Agent, or Firm* — Calfee, Halter & Griswold LLP

(57) ABSTRACT

Shingle blanks are provided. The shingle blanks include an underlay portion having a substrate coated with an asphalt coating and granules, the underlay portion having an upper edge and a lower edge. An overlay portion is adhered to the underlay portion, the overlay portion having a plurality of continuous layered segments, the layered segments having a sealant bead therebetween. A plurality of perforation lines extend in a substantially perpendicular direction from the upper edge to the lower edge of the underlay portion. The plurality of perforation lines are sufficient to facilitate separation of the shingle blank to form hip and ridge roofing shingles configured for application across a ridge or hip.

30 Claims, 7 Drawing Sheets

(56) References Cited

U.S. PATENT DOCUMENTS

| | | |
|---|---|---|
| 1,665,222 A | 4/1928 | Robinson |
| 1,666,429 A | 4/1928 | Stolp, Jr. |
| 1,698,891 A * | 1/1929 | Overbury ................... 29/412 |
| 1,701,926 A | 2/1929 | Kirschbraun |
| 1,799,500 A | 4/1931 | Brophy |
| 1,802,868 A | 4/1931 | Roscoe |
| 1,843,370 A | 2/1932 | Overbury |
| 1,885,346 A | 11/1932 | Harsherger |
| 2,058,167 A | 10/1936 | McQuade |
| 2,161,440 A | 6/1939 | Venrick |
| 2,798,006 A | 7/1957 | Oldfield et al. |
| 2,847,948 A | 8/1958 | Truitt |
| 3,138,897 A | 6/1964 | McCorkle |
| 3,252,257 A | 5/1966 | Price et al. |
| 3,332,830 A | 7/1967 | Tomlinson et al. |
| 3,377,762 A | 4/1968 | Chalmers |
| 3,468,086 A | 9/1969 | Warner |
| 3,468,092 A | 9/1969 | Chalmers |
| 3,624,975 A | 12/1971 | Morgan et al. |
| 3,664,081 A | 5/1972 | Martin et al. |
| 3,813,280 A | 5/1974 | Olszyk et al. |
| 3,913,294 A | 10/1975 | Freiborg |
| 4,194,335 A | 3/1980 | Diamond |
| 4,195,461 A | 4/1980 | Thiis-Evensen |
| 4,274,243 A | 6/1981 | Corbin et al. |
| 4,352,837 A | 10/1982 | Kopenhaver |
| 4,404,783 A * | 9/1983 | Freiborg ................... 52/518 |
| 4,434,589 A | 3/1984 | Freiborg |
| 4,439,955 A | 4/1984 | Freiborg |
| 4,459,157 A | 7/1984 | Koons |
| 4,580,389 A | 4/1986 | Freiborg |
| 4,637,191 A | 1/1987 | Smith |
| 4,672,790 A * | 6/1987 | Freiborg ................... 52/521 |
| 4,680,909 A | 7/1987 | Stewart |
| 4,706,435 A | 11/1987 | Stewart |
| 4,717,614 A * | 1/1988 | Bondoc et al. ................ 428/143 |
| 4,738,884 A | 4/1988 | Algrim et al. |
| 4,755,545 A | 7/1988 | Ialwani |
| 4,789,066 A | 12/1988 | Lisiecki |
| D300,257 S | 3/1989 | Stahl |
| 4,817,358 A | 4/1989 | Lincoln et al. |
| 4,824,880 A | 4/1989 | Algrim et al. |
| 4,835,929 A | 6/1989 | Bondoc et al. |
| 4,848,057 A | 7/1989 | MacDonald et al. |
| 4,856,251 A | 8/1989 | Buck |
| 4,869,942 A | 9/1989 | Jennus et al. |
| D309,027 S | 7/1990 | Noone et al. |
| D313,278 S | 12/1990 | Noone |
| 5,036,119 A | 7/1991 | Berggren |
| 5,039,755 A | 8/1991 | Chamberlain et al. |
| 5,065,553 A | 11/1991 | Magid |
| 5,094,042 A | 3/1992 | Freborg |
| 5,181,361 A | 1/1993 | Hannah et al. |
| 5,195,290 A | 3/1993 | Hulett |
| 5,209,802 A | 5/1993 | Hannah et al. |
| 5,232,530 A * | 8/1993 | Malmquist et al. ............. 156/78 |
| 5,239,802 A | 8/1993 | Robinson |
| 5,247,771 A | 9/1993 | Poplin |
| D340,294 S | 10/1993 | Hannah et al. |
| 5,271,201 A | 12/1993 | Noone et al. |
| 5,295,340 A | 3/1994 | Collins |
| D347,900 S | 6/1994 | Stapleton |
| 5,319,898 A | 6/1994 | Freiborg |
| 5,365,711 A | 11/1994 | Pressutti et al. |
| 5,369,929 A | 12/1994 | Weaver et al. |
| 5,375,387 A | 12/1994 | Davenport |
| 5,375,388 A | 12/1994 | Poplin |
| 5,400,558 A | 3/1995 | Hannah et al. |
| 5,419,941 A | 5/1995 | Noone et al. |
| 5,426,902 A | 6/1995 | Stahl et al. |
| 5,467,568 A * | 11/1995 | Sieling ................... 52/518 |
| 5,471,801 A | 12/1995 | Kupczyk et al. |
| D366,124 S | 1/1996 | Hannah et al. |
| 5,488,807 A | 2/1996 | Terrenzio et al. |
| D369,421 S | 4/1996 | Kiik et al. |
| D375,563 S | 11/1996 | Hannah et al. |
| 5,570,556 A | 11/1996 | Wagner |
| 5,571,596 A * | 11/1996 | Johnson ................... 428/143 |
| 5,575,876 A | 11/1996 | Noone et al. |
| 5,577,361 A | 11/1996 | Grabek, Jr. |
| D376,660 S | 12/1996 | Hanna et al. |
| 5,611,186 A | 3/1997 | Weaver |
| 5,615,523 A | 4/1997 | Wells et al. |
| 5,624,522 A | 4/1997 | Belt et al. |
| D379,672 S | 6/1997 | Lamb et al. |
| 5,660,014 A | 8/1997 | Stahl et al. |
| D383,223 S | 9/1997 | Sieling et al. |
| 5,664,385 A | 9/1997 | Koschitzky |
| 5,666,776 A | 9/1997 | Weaver et al. |
| 5,676,597 A | 10/1997 | Bettoli et al. |
| 5,711,126 A | 1/1998 | Wells et al. |
| 5,746,830 A | 5/1998 | Burton |
| 5,795,389 A | 8/1998 | Koschitzky |
| 5,799,459 A | 9/1998 | Covert |
| D400,268 S | 10/1998 | Sieling et al. |
| 5,822,943 A | 10/1998 | Frankoski et al. |
| D400,981 S | 11/1998 | Bondoc et al. |
| D403,087 S | 12/1998 | Seiling et al. |
| 5,853,858 A | 12/1998 | Bondoc |
| 5,860,263 A | 1/1999 | Sieling et al. |
| D406,361 S | 3/1999 | Bondoc et al. |
| 5,901,517 A | 5/1999 | Stahl et al. |
| 5,916,103 A | 6/1999 | Roberts |
| 5,939,169 A | 8/1999 | Bondoc et al. |
| 5,950,387 A | 9/1999 | Stahl et al. |
| D417,016 S | 11/1999 | Moore et al. |
| D417,513 S | 12/1999 | Blampied |
| 6,010,589 A | 1/2000 | Stahl et al. |
| 6,014,847 A | 1/2000 | Phillips |
| 6,021,611 A | 2/2000 | Wells et al. |
| 6,038,826 A | 3/2000 | Stahl et al. |
| 6,044,608 A | 4/2000 | Stahl et al. |
| 6,070,384 A | 6/2000 | Chich |
| 6,083,592 A | 7/2000 | Chich |
| 6,105,329 A | 8/2000 | Bondoc et al. |
| RE36,858 E | 9/2000 | Pressutti et al. |
| 6,112,492 A | 9/2000 | Wells et al. |
| 6,125,602 A | 10/2000 | Freiborg et al. |
| 6,145,265 A | 11/2000 | Malarkey et al. |
| 6,148,578 A | 11/2000 | Nowacek et al. |
| 6,156,289 A | 12/2000 | Chopra |
| 6,182,400 B1 | 2/2001 | Freiborg et al. |
| 6,185,895 B1 | 2/2001 | Rettew |
| 6,190,754 B1 | 2/2001 | Bondoc et al. |
| 6,199,338 B1 | 3/2001 | Hudson, Jr. et al. |
| 6,220,329 B1 | 4/2001 | King et al. |
| 6,253,512 B1 | 7/2001 | Thompson et al. |
| 6,310,122 B1 | 10/2001 | Butler et al. |
| 6,343,447 B2 | 2/2002 | Geissels et al. |
| 6,351,913 B1 | 3/2002 | Freiborg et al. |
| 6,355,132 B1 | 3/2002 | Becker et al. |
| 6,361,851 B1 | 3/2002 | Sieling et al. |
| 6,397,546 B1 | 6/2002 | Malarkey et al. |
| 6,397,556 B1 | 6/2002 | Karpinia |
| 6,401,425 B1 | 6/2002 | Frame |
| 6,426,309 B1 | 7/2002 | Miller et al. |
| 6,467,235 B2 | 10/2002 | Kalkanoglu et al. |
| 6,471,812 B1 | 10/2002 | Thompson et al. |
| D466,629 S | 12/2002 | Phillips |
| 6,487,828 B1 | 12/2002 | Phillips |
| 6,494,010 B1 | 12/2002 | Brandon et al. |
| 6,510,664 B2 | 1/2003 | Kupczyk |
| 6,523,316 B2 | 2/2003 | Stahl et al. |
| 6,530,189 B2 | 3/2003 | Freshwater et al. |
| D473,326 S | 4/2003 | Phillips |
| 6,565,431 B1 | 5/2003 | Villela |
| 6,578,336 B2 | 6/2003 | Elliott |
| 6,610,147 B2 | 8/2003 | Aschenbeck |
| 6,652,909 B2 | 11/2003 | Lassiter |
| 6,679,020 B2 | 1/2004 | Becker et al. |
| 6,679,308 B2 | 1/2004 | Becker et al. |
| 6,691,489 B2 | 2/2004 | Frame |
| 6,708,456 B2 | 3/2004 | Kiik et al. |
| 6,709,760 B2 | 3/2004 | Trumbore et al. |

(56) References Cited

U.S. PATENT DOCUMENTS

| | | | |
|---|---|---|---|
| 6,709,994 B2 | 3/2004 | Miller et al. | |
| 6,725,609 B2 | 4/2004 | Freiborg et al. | |
| 6,758,019 B2 | 7/2004 | Kalkanoglu et al. | |
| 6,759,454 B2 | 7/2004 | Stephens et al. | |
| 6,790,307 B2 | 9/2004 | Elliott | |
| 6,804,919 B2 | 10/2004 | Raikar | |
| 6,813,866 B2 | 11/2004 | Naipawer, III | |
| 6,823,637 B2 | 11/2004 | Elliott et al. | |
| 6,895,724 B2 | 5/2005 | Naipawer, III | |
| 6,933,037 B2 * | 8/2005 | McCumber et al. | 428/143 |
| 6,936,329 B2 | 8/2005 | Kiik et al. | |
| 6,990,779 B2 | 1/2006 | Kiik et al. | |
| 7,021,468 B2 | 4/2006 | Cargile, Jr. | |
| 7,048,990 B2 | 5/2006 | Koschitzky | |
| 7,070,051 B2 | 7/2006 | Kanner et al. | |
| 7,073,295 B2 | 7/2006 | Pressutti et al. | |
| 7,082,724 B2 | 8/2006 | Raikar et al. | |
| 7,118,794 B2 | 10/2006 | Kalkanoglu et al. | |
| 7,121,055 B2 | 10/2006 | Penner | |
| 7,124,548 B2 | 10/2006 | Presutti et al. | |
| 7,146,771 B2 | 12/2006 | Swann | |
| 7,165,363 B2 | 1/2007 | Headrick et al. | |
| 7,238,408 B2 | 7/2007 | Aschenbeck et al. | |
| 7,267,862 B1 | 9/2007 | Burke et al. | |
| 7,282,536 B2 | 10/2007 | Handlin et al. | |
| D610,720 S | 2/2010 | Elliott | |
| 7,765,763 B2 | 8/2010 | Teng et al. | |
| 7,781,046 B2 | 8/2010 | Kalkanoglu et al. | |
| 7,805,905 B2 | 10/2010 | Rodrigues et al. | |
| 7,820,237 B2 | 10/2010 | Harrington, Jr. | |
| 7,836,654 B2 | 11/2010 | Belt et al. | |
| 7,877,949 B1 | 2/2011 | Elliott | |
| 7,909,235 B2 | 3/2011 | Holley, Jr. | |
| 7,921,606 B2 * | 4/2011 | Quaranta et al. | 52/57 |
| 8,006,457 B2 | 8/2011 | Binkley et al. | |
| 8,127,514 B2 | 3/2012 | Binkley et al. | |
| 8,181,413 B2 | 5/2012 | Belt et al. | |
| 8,216,407 B2 | 7/2012 | Kalkanoglu et al. | |
| 8,240,102 B2 | 8/2012 | Belt et al. | |
| 8,266,861 B2 | 9/2012 | Koch et al. | |
| 8,281,520 B2 | 10/2012 | Quaranta et al. | |
| 8,281,539 B2 | 10/2012 | Kalkanoglu | |
| 8,302,358 B2 | 11/2012 | Kalkanoglu | |
| 8,316,608 B2 | 11/2012 | Binkley et al. | |
| 8,323,440 B2 | 12/2012 | Koch et al. | |
| 8,371,085 B2 | 2/2013 | Koch | |
| 8,453,408 B2 | 6/2013 | Kalkanoglu | |
| 2001/0000372 A1 | 4/2001 | Kalkanoglu et al. | |
| 2001/0049002 A1 | 12/2001 | McCumber et al. | |
| 2002/0000068 A1 | 1/2002 | Freiborg et al. | |
| 2002/0038531 A1 | 4/2002 | Freshwater et al. | |
| 2002/0078651 A1 | 6/2002 | Freshwater et al. | |
| 2003/0040241 A1 | 2/2003 | Kiik et al. | |
| 2003/0070579 A1 | 4/2003 | Hong et al. | |
| 2003/0093958 A1 * | 5/2003 | Freiborg et al. | 52/73 |
| 2003/0093963 A1 | 5/2003 | Stahl et al. | |
| 2003/0138601 A1 | 7/2003 | Elliott | |
| 2004/0055240 A1 | 3/2004 | Kiik et al. | |
| 2004/0055241 A1 | 3/2004 | Raikar | |
| 2004/0079042 A1 | 4/2004 | Elliott | |
| 2004/0083672 A1 * | 5/2004 | Penner | 52/518 |
| 2004/0083673 A1 | 5/2004 | Kalkanoglu et al. | |
| 2004/0083674 A1 | 5/2004 | Kalkanoglu et al. | |
| 2004/0111996 A1 | 6/2004 | Heronome | |
| 2004/0123537 A1 | 7/2004 | Elliott et al. | |
| 2004/0123543 A1 | 7/2004 | Elliott et al. | |
| 2004/0148874 A1 | 8/2004 | Jolitz et al. | |
| 2004/0172908 A1 | 9/2004 | Swann | |
| 2004/0206012 A1 | 10/2004 | Pressutti et al. | |
| 2004/0206035 A1 * | 10/2004 | Kandalgaonkar | 52/551 |
| 2004/0258883 A1 | 12/2004 | Weaver | |
| 2005/0005555 A1 | 1/2005 | Naipawar | |
| 2005/0137295 A1 | 6/2005 | Kendrick et al. | |
| 2005/0193673 A1 | 9/2005 | Rodrigues et al. | |
| 2005/0204675 A1 | 9/2005 | Snyder et al. | |
| 2005/0210808 A1 | 9/2005 | Larson et al. | |
| 2005/0235599 A1 | 10/2005 | Kalkanoglu et al. | |
| 2006/0032174 A1 | 2/2006 | Floyd | |
| 2006/0175386 A1 | 8/2006 | Holley, Jr. | |
| 2006/0179767 A1 | 8/2006 | Miller et al. | |
| 2006/0201094 A1 | 9/2006 | Lassiter | |
| 2006/0265990 A1 | 11/2006 | Kalkanoglu et al. | |
| 2007/0020436 A1 | 1/2007 | Teng et al. | |
| 2007/0039274 A1 * | 2/2007 | Harrington et al. | 52/518 |
| 2007/0042158 A1 | 2/2007 | Belt et al. | |
| 2007/0107372 A1 | 5/2007 | Harrington, Jr. | |
| 2007/0144077 A1 | 6/2007 | Quaranta et al. | |
| 2007/0179220 A1 | 8/2007 | Sasagawa et al. | |
| 2007/0266665 A1 | 11/2007 | Todd et al. | |
| 2008/0134612 A1 | 6/2008 | Koschitzky | |
| 2009/0038257 A1 | 2/2009 | Todd et al. | |
| 2009/0139175 A1 | 6/2009 | Todd et al. | |
| 2009/0282767 A1 | 11/2009 | Grubka | |
| 2010/0077689 A1 | 4/2010 | Kalkanoglu et al. | |
| 2010/0143667 A1 | 6/2010 | Collins et al. | |
| 2010/0192496 A1 | 8/2010 | Koch et al. | |
| 2010/0192500 A1 | 8/2010 | Koch | |
| 2010/0212240 A1 | 8/2010 | Grubka | |
| 2010/0212246 A1 | 8/2010 | Grubka | |
| 2010/0218433 A1 * | 9/2010 | Quaranta et al. | 52/57 |
| 2010/0236178 A1 | 9/2010 | Loftus | |
| 2010/0239807 A1 | 9/2010 | Grubka | |
| 2010/0310825 A1 | 12/2010 | Kalkanoglu et al. | |
| 2011/0005158 A1 | 1/2011 | Kailey et al. | |
| 2011/0126485 A1 | 6/2011 | Bleil et al. | |
| 2011/0151170 A1 | 6/2011 | Grubka et al. | |
| 2011/0209428 A1 | 9/2011 | Elliott | |
| 2011/0319533 A1 | 12/2011 | Gauthier et al. | |

FOREIGN PATENT DOCUMENTS

| | | |
|---|---|---|
| JP | 50-002937 | 1/1975 |
| WO | 2005/100479 | 10/2005 |
| WO | 2007/108846 | 9/2007 |
| WO | 2008/052029 | 5/2008 |
| WO | 2009/016281 | 2/2009 |
| WO | 2010/098972 | 9/2010 |
| WO | 2011/100217 | 8/2011 |

OTHER PUBLICATIONS

Office action from U.S. Appl. No. 13/039,726 dated Feb. 5, 2014.
Office action from U.S. Appl. No. 12/727,459 dated Jan. 10, 2014.
Haynes, Shellflex 3681 MSDS, Jan. 4, 1999, 5 pgs.
Office action from U.S. Appl. No. 12/727,459 dated May 30, 2012.
Office action from U.S. Appl. No. 12/727,459 dated Oct. 3, 2012.
Office action from U.S. Appl. No. 12/727,470 dated Aug. 10, 2012.
Office action from U.S. Appl. No. 12/831,130 dated Feb. 29, 2012.
Office action from U.S. Appl. No. 12/831,130 dated Jun. 14, 2012.
Office action from U.S. Appl. No. 12/831,130 dated Aug. 9, 2012.
Office action from U.S. Appl. No. 13/019,028 dated Aug. 10, 2011.
Office action from U.S. Appl. No. 13/019,028 dated Jun. 21, 2012.
Office action from Chinese application No. 200680028893.4 dated Apr. 24, 2009.
Office action from Japanese Application No. 2008-525265 dated Dec. 12, 2001.
Office action from U.S. Appl. No. 13/019,028 dated Dec. 19, 2012.
Advisory Action from U.S. Appl. No. 12/727,459 dated Dec. 13, 2012.
Office action from U.S. Appl. No. 13/344,025 dated Feb. 5, 2013.
Office action from U.S. Appl. No. 13/344,025 dated Mar. 27, 2014.
Interview Summary from U.S. Appl. No. 12/702,457 dated Feb. 26, 2014.
Office action from U.S. Appl. No. 12/727,470 dated Apr. 10, 2013.
Office action from U.S. Appl. No. 12/727,459 dated Jul. 11, 2013.
Office action from U.S. Appl. No. 12/702,457, filed Nov. 21, 2013.
Office action from U.S. Appl. No. 13/344,025 dated Aug. 16, 2013.
Office action from U.S. Appl. No. 12/702,457 dated May 7, 2014.
International Search Report from PCT/US06/30633 dated Nov. 28, 2006.

(56) References Cited

OTHER PUBLICATIONS

International Search Report and Written Opinion from PCT/US11/023989 dated May 26, 2011.
International Search Report and Written Opinion from PCT/US10/23541 dated Jul. 6, 2010.
Office action from U.S. Appl. No. 09/515,928 dated Mar. 15, 2001.
Office action from U.S. Appl. No. 09/515,928 dated Oct. 11, 2001.
Office action from U.S. Appl. No. 09/515,928 dated Jan. 2, 2002.
Advisory action from U.S. Appl. No. 09/515,928 dated Jun. 7, 2002.
Office action from U.S. Appl. No. 09/515,928 dated Sep. 16, 2004.
Advisory action from U.S. Appl. No. 09/515,928 dated Feb. 22, 2005.
Office action from U.S. Appl. No. 09/515,928 dated Dec. 2, 2005.
Office action from U.S. Appl. No. 09/515,928 dated Apr. 25, 2008.
Office action from U.S. Appl. No. 09/515,928 dated Oct. 11, 2006.
Office action from U.S. Appl. No. 09/515,928 dated Apr. 20, 2007.
Advisory action from U.S. Appl. No. 09/515,928 dated Jul. 19, 2007.
Office action from U.S. Appl. No. 09/515,928 dated Sep. 19, 2007.
Notice of Panel Decision from Pre-Appeal Brief Review from U.S. Appl. No. 09/515,928 dated Feb. 8, 2008.
Examiner's Answer from U.S. Appl. No. 09/515,928 dated Jun. 18, 2008.
Decision on Appeal from 09/515,928 dated Jul. 28, 2010.
Notice of Allowance from U.S. Appl. No. 09/515,928 dated Sep. 27, 2010.
Office action from U.S. Appl. No. 12/119,937 dated Apr. 14, 2010.
Office action from U.S. Appl. No. 12/119,937 dated Nov. 4, 2010.
Advisory action from U.S. Appl. No. 12/119,937 dated Jan. 19, 2011.
Office action from U.S. Appl. No. 12/119,937 dated Apr. 3, 2012.
Office action from U.S. Appl. No. 12/392,392 dated Mar. 4, 2010.
Office action from U.S. Appl. No. 12/392,392 dated Sep. 13, 2010.
Advisory Action from U.S. Appl. No. 12/392,392 dated Dec. 14, 2010.
Office action from U.S. Appl. No. 12/392,392 dated Dec. 22, 2010.
Interview Summary from U.S. Appl. No. 12/392,392 dated Feb. 3, 2011.
Office action from U.S. Appl. No. 12/392,392 dated Aug. 18, 2011.
Office action from U.S. Appl. No. 12/392,392 dated Nov. 21, 2011.
Advisory Action from U.S. Appl. No. 12/392,392 dated Feb. 27, 2012.
Office action from U.S. Appl. No. 12/392,392 dated Jun. 14, 2012.
Office action from U.S. Appl. No. 12/392,392 dated Jul. 19, 2012.
Office action from U.S. Appl. No. 12/702,457 dated Jun. 18, 2012.
Office action from U.S. Appl. No. 12/702,457 dated Jul. 20, 2012.
Office action from U.S. Appl. No. 12/727,459 dated May 25, 2011.
Office action from U.S. Appl. No. 12/727,459 dated Aug. 30, 2011.
Interview Summary from U.S. Appl. No. 12/727,459 dated Dec. 28, 2011.
Office action from U.S. Appl. No. 12/727,459 dated Jan. 19, 2012.
Interview Summary from U.S. Appl. No. 12/727,459 dated Apr. 13, 2012.
Office action from U.S. Appl. No. 13/193,864 dated May 15, 2013.
Office action from U.S. Appl. No. 13/344,025 dated Feb. 26, 2015.
Interview Summary from U.S. Appl. No. 12/702,457 dated Mar. 4, 2015.
Interview Summary from U.S. Appl. No. 13/039,726 dated Oct. 28, 2014.
Notice of Allowance from U.S. Appl. No. 13/039,726 dated Jan. 22, 2015
Office action from U.S. Appl. No. 12/727,459 dated Jan. 26, 2015.
Office action from U.S. Appl. No. 12/727,470 dated May 26, 2015.
Interview Summary from U.S. Appl. No. 13/344,025 dated May 21, 2015.
Notice of Allowance from U.S. Appl. No. 12/702,457 dated May 26, 2015.

* cited by examiner

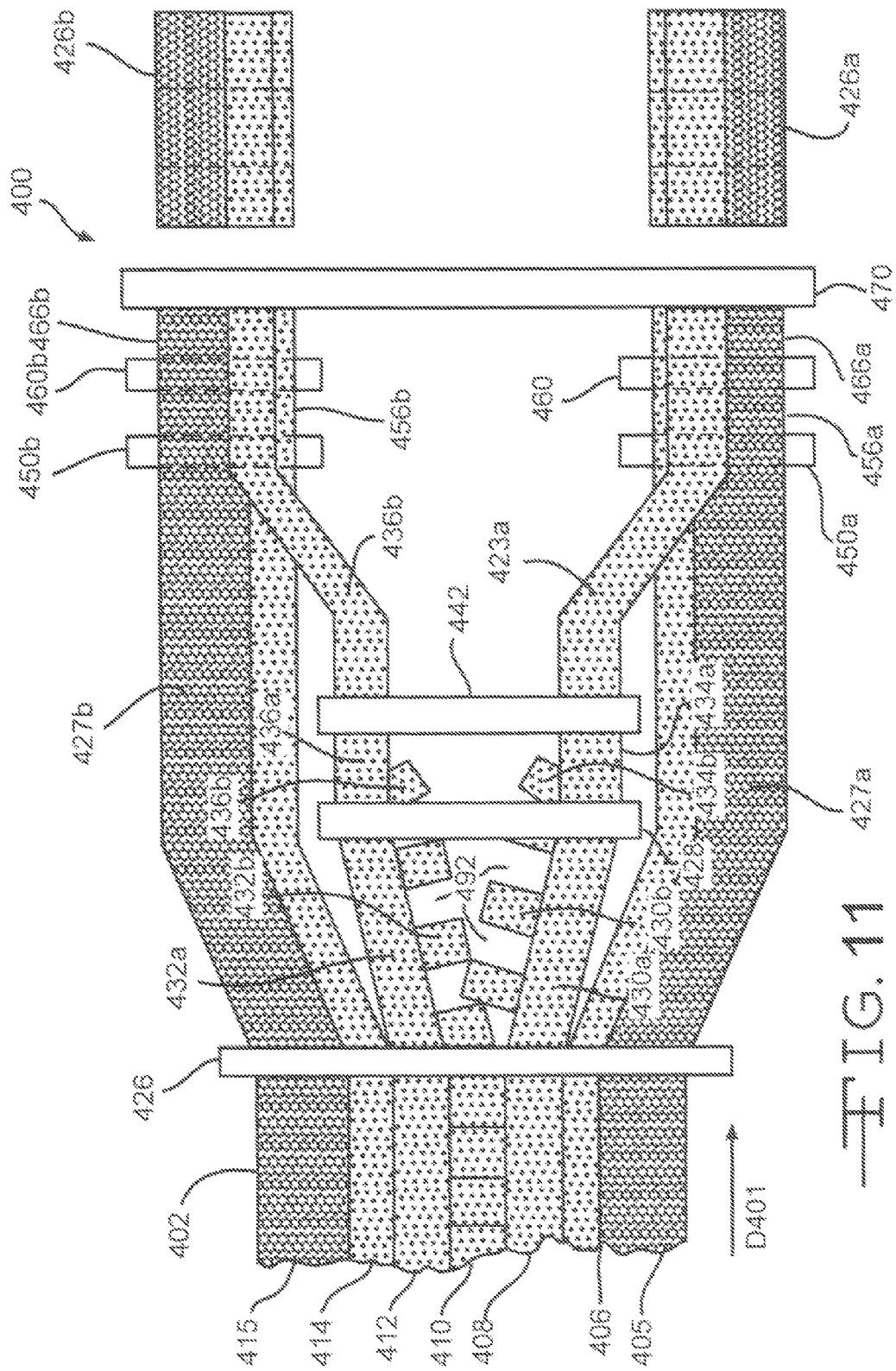

HIP AND RIDGE ROOFING SHINGLE

BACKGROUND

Asphalt-based roofing materials, such as roofing shingles, roll roofing and commercial roofing, are installed on the roofs of buildings to provide protection from the elements. The roofing material may be constructed of a substrate such as a glass fiber mat or an organic felt, an asphalt coating on the substrate, and a surface layer of granules embedded in the asphalt coating.

Roofing materials can be applied to roofs having various surfaces formed by roofing planes. The various surfaces and roofing planes form intersections, such as for example, hips and ridges. A ridge is the uppermost horizontal intersection of two sloping roof planes. Hips are formed by the intersection of two sloping roof planes running from a ridge to the eaves.

It would be desirable to improve the methods used to manufacture hip and ridge roofing material to be more efficient.

SUMMARY

In accordance with embodiments of this invention there are provided shingle blanks. The shingle blanks include an underlay portion having a substrate coated with an asphalt coating and granules, the underlay portion having an upper edge and a lower edge. An overlay portion is adhered to the underlay portion, the overlay portion having a plurality of continuous layered segments, the layered segments having a sealant bead therebetween. A plurality of perforation lines extend in a substantially perpendicular direction from the upper edge to the lower edge of the underlay portion. The plurality of perforation lines are sufficient to facilitate separation of the shingle blank to form hip and ridge roofing shingles configured for application across a ridge or hip.

In accordance with other embodiments, there are also provided methods of manufacturing an asphalt-based shingle blank. The methods include the steps of forming a continuous sheet having a substrate coated with an asphalt coating and granules, the continuous sheet having a plurality of lanes configured to form an overlay portion and a plurality of lanes configured to form an underlay portion, separating the plurality of lanes configured to form an overlay portion from the plurality of lanes configured to form an underlay portion, folding the plurality of lanes configured to form an overlay portion thereby forming an overlay portion, the overlay portion having continuous layered segments, adhering the overlay portion to the plurality of lanes configured to form an underlay portion thereby forming an applied sheet, forming a plurality of perforation lines in the applied sheet and cutting the applied sheet into shingle blanks.

In accordance with other embodiments, there are also provided methods of installing an asphalt-based roofing shingle. The methods include the steps of providing an asphalt-based shingle blank having an overlay portion adhered to an underlay portion, the underlay portion having a substrate coated with an asphalt coating and granules, the underlay portion having an upper edge and a lower edge, the overlay portion having a plurality of continuous layered segments, the layered segments having a sealant bead therebetween, wherein a plurality of perforation lines extend in a substantially perpendicular direction from the upper edge to the lower edge of the sheet, separating the shingle blank along the plurality of perforation lines to form hip and ridge roofing shingles and installing the hip and ridge shingles across a hip or ridge.

Various advantages of this invention will become apparent to those skilled in the art from the following detailed description of the invention, when read in light of the accompanying drawings.

BRIEF DESCRIPTION OF THE DRAWINGS

FIG. 11 is a plan view of a second embodiment of an apparatus for manufacturing the shingle blank of FIG. 8.

DETAILED DESCRIPTION OF THE INVENTION

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. As used in the description of the invention and the appended claims, the singular forms "a," "an," and "the" are intended to include the plural forms as well, unless the context clearly indicates otherwise.

Unless otherwise indicated, all numbers expressing quantities of dimensions such as length, width, height, and so forth as used in the specification and claims are to be understood as being modified in all instances by the term "about." Accordingly, unless otherwise indicated, the numerical properties set forth in the specification and claims are approximations that may vary depending on the desired properties sought to be obtained in embodiments of the present invention. Notwithstanding that the numerical ranges and parameters setting forth the broad scope of the invention are approximations, the numerical values set forth in the specific examples are reported as precisely as possible. Any numerical values, however, inherently contain certain errors necessarily resulting from error found in their respective measurements.

In accordance with embodiments of the present invention, hip and ridge roofing shingles, and methods to manufacture the hip and ridge roofing shingles, are provided. It will be understood the term "ridge" refers to the intersection of the uppermost sloping roof planes. The term "roof plane" is defined to mean a plane defined by a flat portion of the roof formed by an area of roof deck. The term "hip" is defined to mean the intersection of sloping roof planes located below the ridge. It will be understood the term "slope" is defined to mean the degree of incline of a roof plane. The term "granule" is defined to mean particles that are applied to a shingle that is installed on a roof.

Figure 1:
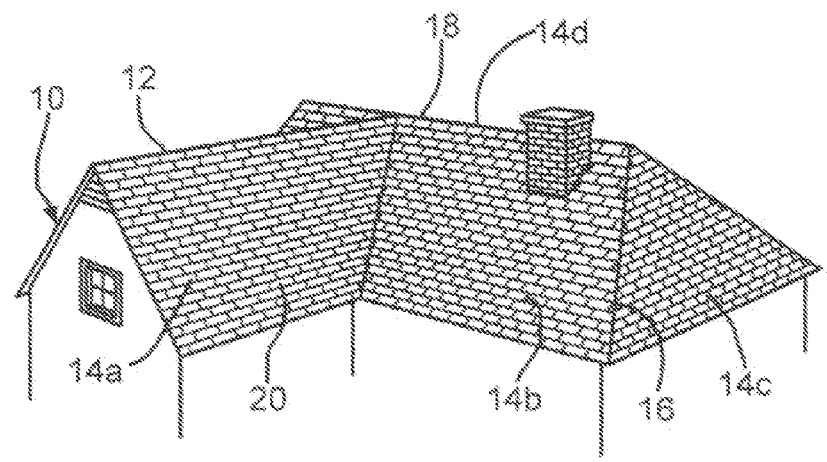
FIG. 1 is a perspective view of a building structure incorporating hip and ridge roofing shingles in accordance with embodiments of this invention.

The description and figures disclose hip and ridge roofing shingles for a roofing system and methods of manufacturing the hip and ridge roofing shingles. Referring now to FIG. 1, a building structure 10 is shown having a shingle-based roofing system 12. While the building structure 10 illustrated in FIG. 1 is a residential home, it should be understood that the building structure 10 can be any type of structure, such as a garage, church, arena, industrial or commercial building, having a shingle-based roofing system 12.

The building structure 10 has a plurality of roof planes 14a-14d. The roof planes 14a-14d can have a slope. While the roof planes 14a-14d shown in FIG. 1 have their respective illustrated slopes, it should be understood that the roof planes 14a-14d can have any desired slope. The intersection of the roof planes 14b and 14c form a hip 16. Similarly, the intersection of the roof planes 14b and 14d form a ridge 18. The building structure 10 is covered by the roofing system 12 having a plurality of shingles 20.

Figure 2:
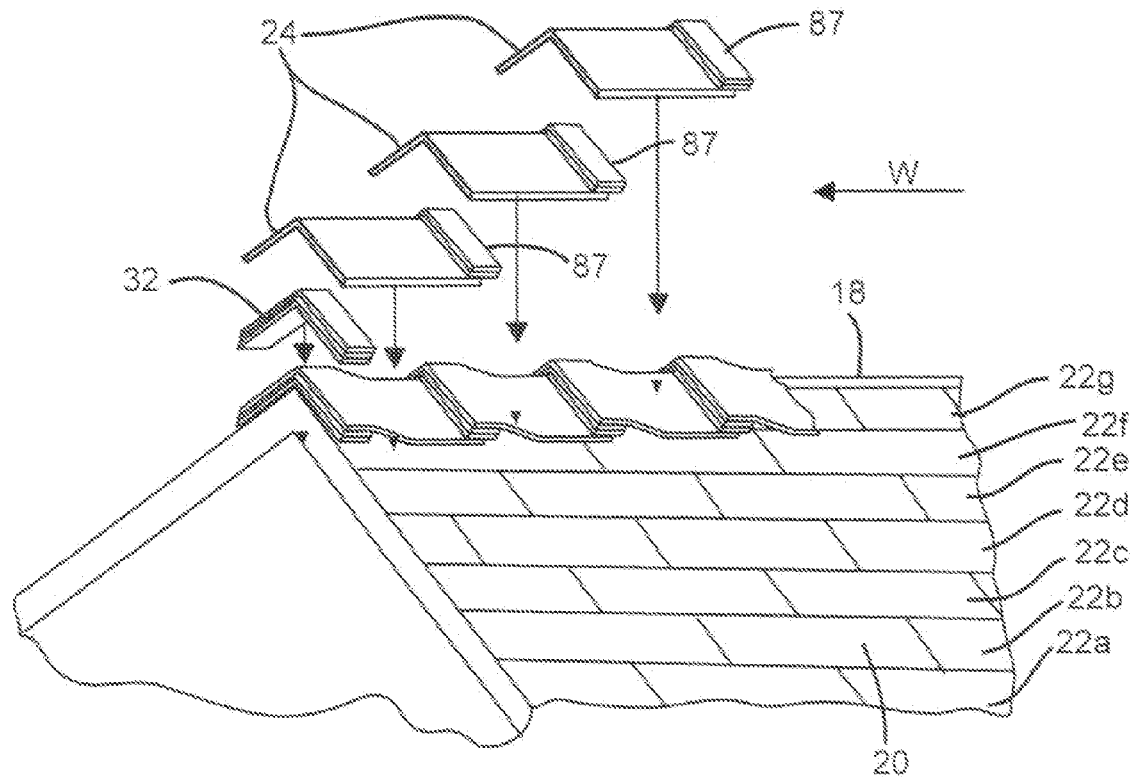
FIG. 2 is a perspective view of the installation of the hip and ridge roofing shingles of FIG. 1.

Referring now to FIG. 2, the shingles 20 are installed on the various roof planes 14a-14d in generally horizontal courses 22a-22g in which the shingles 20 overlap the shingles 20 of a preceding course. The shingles 20 shown in FIGS. 1 and 2 can be any desired shingle.

Hip and ridge roofing shingles are installed to protect hips and ridges from the elements. As shown in FIG. 2, hip and ridge roofing shingles 24 are installed in an overlapping manner on the ridge 18 and over the shingles 20. In a similar fashion, hip and ridge roofing shingles (not shown) are installed on a hip and over the shingles. The method of installing the hip and ridge roofing shingles 24 will be discussed in more detail below.

Figure 3:
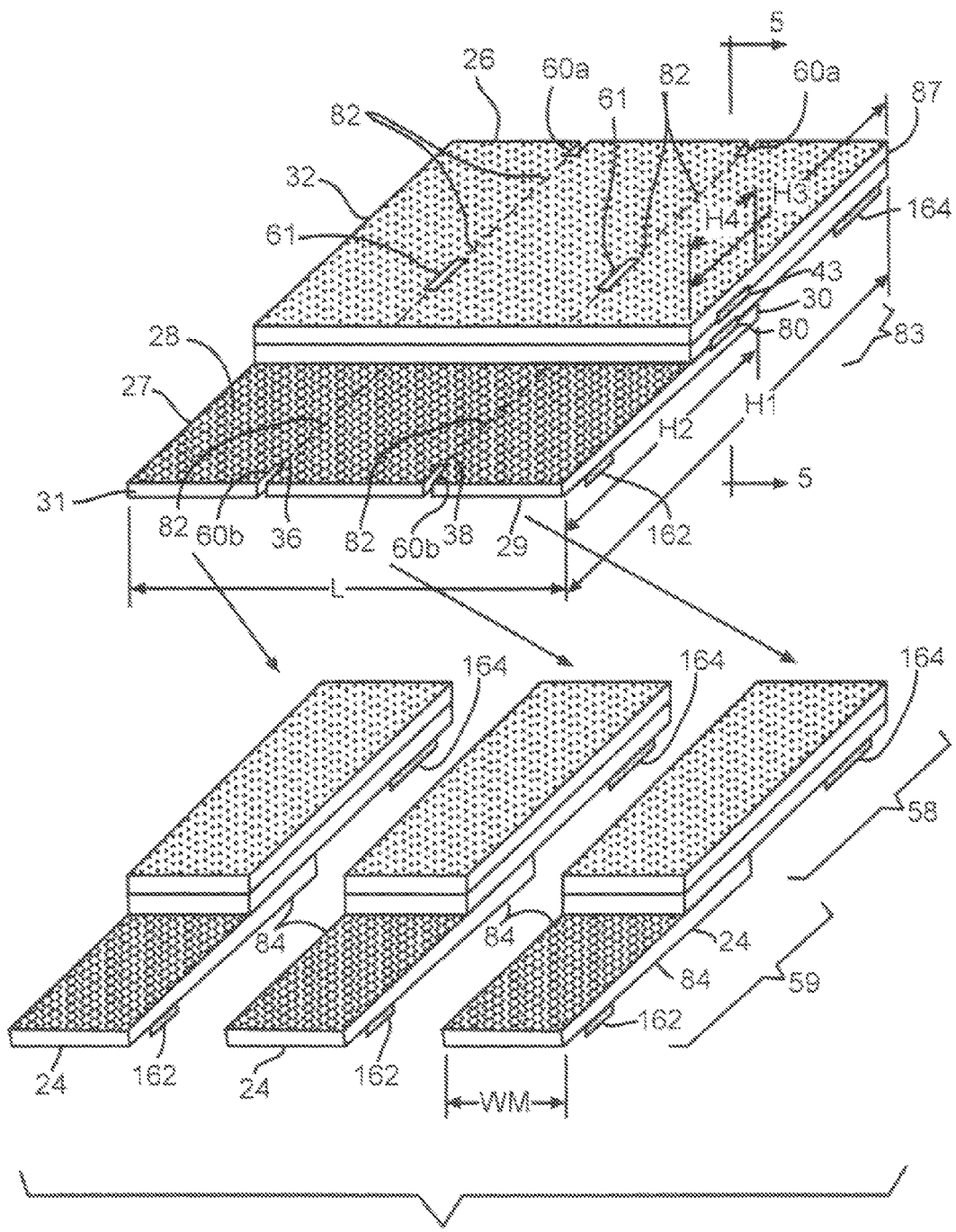
FIG. 3 is a perspective view of a shingle blank used for making the hip and ridge roofing shingles of FIG. 2.

Referring now to FIG. 3, hip and ridge roofing shingles 24 are made from a shingle blank 26. The shingle blank 26 includes an underlay portion 27 and an overlay portion 32. As will be discussed in more detail below, the underlay portion 27 and the overlay portion 32 can be formed from the same granule-covered, asphalt-coated substrate material, separated from each other and subsequently adhered together. The shingle blank 26 has a leading edge 87. The underlay portion 27 has an upper surface 28, a lower surface 29, an upper edge 30 and a lower edge 31.

Referring again to FIG. 3, the shingle blank 26 may have any desired dimensions. For example, a typical residential roofing shingle blank 26 has a length L of approximately 36 inches (91.5 cm) and a height H1 in a range of from about 14.0 inches (35.6 cm) to about 18.0 inches (45.7 cm) high. However, it will be understood that other desired lengths L and heights H1 can be used.

As shown in FIG. 3, the shingle blank 26 includes first and second perforation lines, 36 and 38. As will be discussed in more detail below, the first and second perforation lines, 36 and 38, are configured to allow separation of the shingle blank 26 into pieces, thereby forming hip and ridge roofing shingles 24.

Referring again to FIG. 3, the overlay portion 32 extends substantially across the length L of the shingle blank 26. The term "substantially" as used herein, is defined to mean any desired distance in a range of from between approximately one-half of the length L to the full length L.

Figure 4:
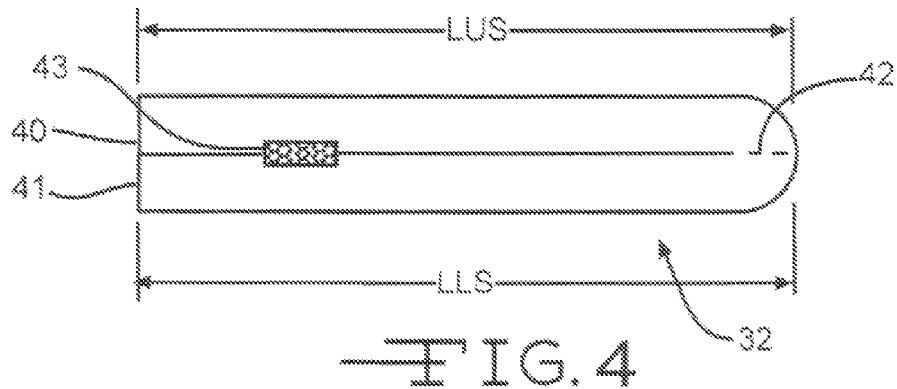
FIG. 4 is a side view in elevation of an overlay portion of the shingle blank of FIG. 3.

Referring now to FIG. 4, the overlay portion 32 includes an upper segment 40 and a lower segment 41. As will be explained in more detail below, the upper segment 40 and the lower segment 41 are formed from a continuous substrate coated with an asphalt coating and the coating itself is subsequently coated with granules. In the embodiment shown in FIG. 4, the upper segment 40 and the lower segment 41 combine to form a substantially flattened U-shaped cross-sectional shape. However, the overlay portion 32 can form other desired cross-sectional shapes.

Referring again to FIG. 4, a sealant bead 43 is positioned between the upper segment 40 and the lower segment 41. The sealant bead 43 is configured to provide an adhesive seal between the upper and lower segments, 40 and 41. The sealant bead 43 can be any suitable sealant or adhesive and can be applied in any form or configuration in any location between the upper segment 40 and the lower segment 41. In one embodiment, the sealant bead 43 can be a single continuous strip or a plurality of continuous strips. In other embodiments, the sealant bead 43 can have a constant width or a varying width. In still other embodiments, the sealant bead 43 can be a single discontinuous strip or a plurality of discontinuous strips having varying widths. One example of a sealant bead is the sealant line of the type disclosed in U.S. Pat. No. 4,738,884 to Algrim et al., the disclosure of which is incorporated herein in its entirety.

Referring again to FIG. 4, the upper segment 40 has a length LUS and the lower segment 41 has a length LLS. In the illustrated embodiment, the lengths LUS and LLS of the upper and lower segments, 40 and 41, are in a range of from about 4.0 inches to about 10.0 inches. However, in other embodiments, the lengths LUS and LLS can be different. While the lengths LUS and LLS are shown in the current embodiment as being the same, it should be appreciated that the lengths LUS and LLS can be different from each other.

As shown in FIG. 4, the overlay portion 32 can include an optional overlay perforation line 42. As will be described in more detail below, the overlay perforation line 42 is configured to facilitate folding of a granule and asphalt coated substrate.

Figure 5:
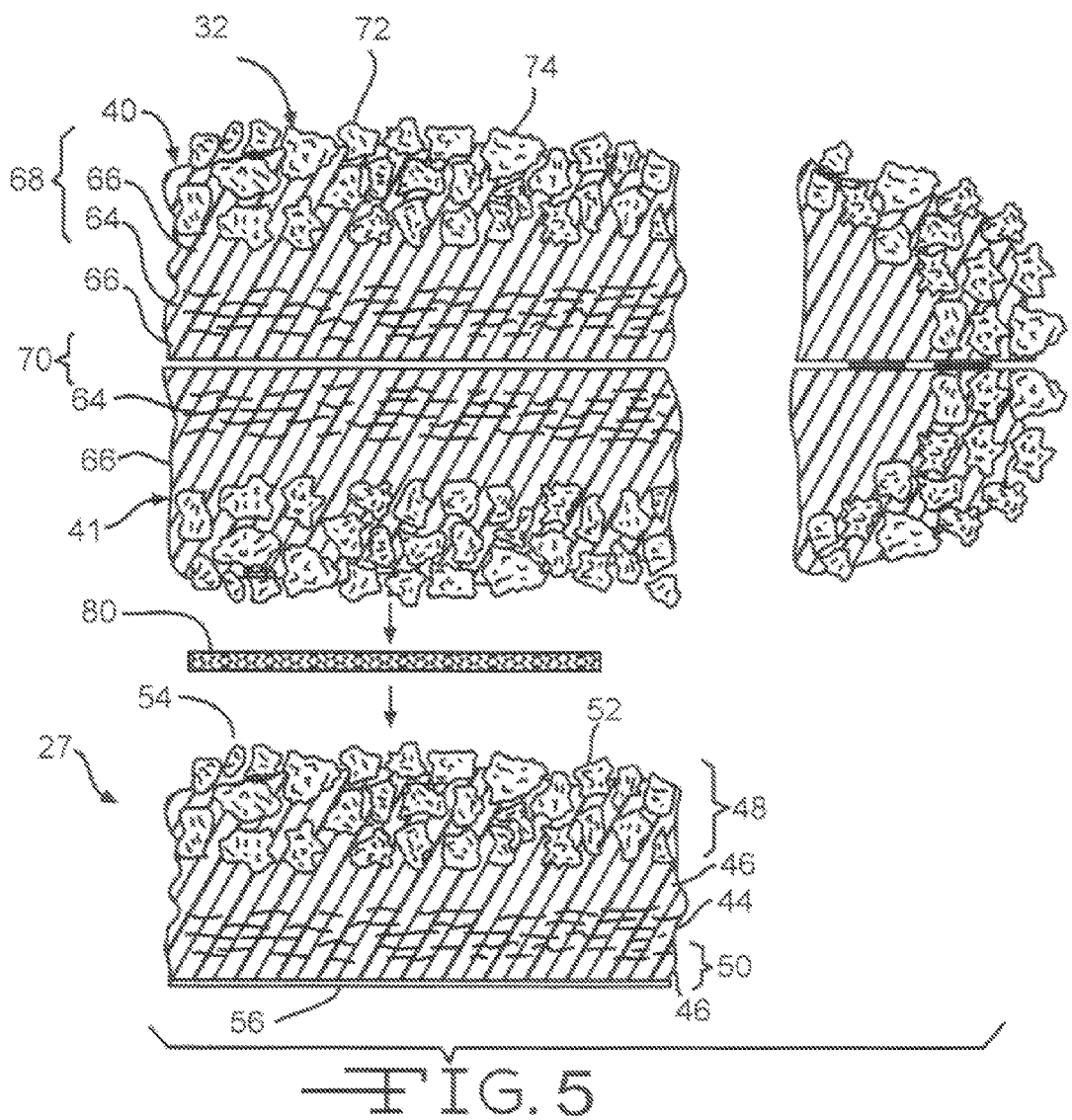
FIG. 5 is an enlarged cross-sectional view, taken along the line 5-5 of FIG. 3, of a portion of the hip and ridge roofing shingle of FIG. 3.

Referring now to FIG. 5, an enlarged cross-sectional view of a portion of the underlay portion 27 and a portion of the overlay portion 32 are illustrated. Referring first to the underlay portion 27, a substrate 44 is coated with an asphalt coating 46. The substrate 44 can be any suitable substrate for use in reinforcing asphalt-based roofing materials, including, but not limited to a nonwoven web, scrim or felt of fibrous materials such as glass fibers, mineral fibers, cellulose fibers, rag fibers, mixtures of mineral and synthetic fibers, or the like. Combinations of materials can also be used in the substrate 44.

The asphalt coating 46 includes an upper region 48 that is positioned above the substrate 44 when the roofing material is installed on a roof, and a lower region 50 that is positioned below the substrate 44. The upper region 48 includes an upper surface 52. The term "asphalt coating" means any type of bituminous material suitable for use on a roofing material, including, but not limited to asphalts, tars, pitches, or mixtures thereof. The asphalt can be either manufactured asphalt produced by refining petroleum or naturally occurring asphalt. The asphalt coating 46 can include various additives and/or modifiers, such as inorganic fillers or mineral stabilizers, organic materials such as polymers, recycled streams, or ground tire rubber.

A layer of granules 54 is pressed into the upper surface 52 of the upper region 48. The granules 54 can be any desired granules or combination of granules. Some examples of granules include prime, headlap granules or waste granules. Optionally, the lower region 50 can be coated with any desired backdust material 56.

Referring again to FIG. 5, the overlay portion 32 includes an overlay substrate 64 coated with an overlay asphalt coating 66. The overlay asphalt coating 66 includes an overlay upper region 68 and an overlay lower region 70. The overlay upper region 68 includes an overlay upper surface 72. A layer of overlay granules 74 is pressed into the overlay upper surface 72 of the overlay upper region 68. Optionally, the overlay lower region 70 can be coated with any desired overlay backdust material (not shown). In the illustrated embodiment, the overlay substrate 64, overlay asphalt coating 66, overlay upper and lower regions, 68 and 70, overlay upper surface 72, overlay granules 74 and overlay backdust material are the same as, or similar to the substrate 44, asphalt coating 46, upper and lower regions, 48 and 50, upper surface 52, granules 54 and backdust material 56 illustrated for the underlay portion 27 and discussed above. Alternatively, the overlay substrate 64, overlay asphalt coating 66, overlay upper and lower regions, 68 and 70, overlay upper surface 72, overlay granules 74 and overlay backdust material can be different.

As shown in FIG. 5, the overlay portion 32 is adhered to the underlay portion 27 by an adhesive material 80 such that the lower segment 41 of the overlay portion 32 is attached to the upper surface 52 of the underlay portion 27. The adhesive material 80 is configured to provide an adhesive seal between the overlay portion 32 and the underlay portion 27. The adhesive material 80 can be any suitable adhesive and can be applied in any form or configuration in any location between the overlay portion 32 and the underlay portion 27. The manufacturing process of forming the overlay portion 32 and adhesion of the overlay portion 32 to the underlay portion 27 will be discussed in more detail below.

Referring again to FIG. 3, the shingle blank 26 includes the first and second perforation lines 36 and 38. The first and second perforation lines, 36 and 38, include perforations 82. The first and second perforation lines, 36 and 38, are spaced apart substantially perpendicular to the lower edge 31 of the shingle blank 26 and span the height H1 of the shingle blank 26. The first and second perforation lines, 36 and 38, are positioned such that subsequent separation of the shingle blank 26 along the first and second perforation lines, 36 and 38, forms hip and ridge roofing shingles 24. In the illustrated embodiment, the formed hip and ridge roofing shingles 24 have a width WM. In the illustrated embodiment, the width WM of the hip and ridge roofing shingles 24 is approximately 12.0 inches. In other embodiments, the width WM of the hip and ridge roofing shingles 24 can be more or less than approximately 12.0 inches. While in the illustrated embodiment, the width WM of the formed hip and ridge roofing shingles 24 are the same, in other embodiments, the hip and ridge roofing shingles 24 can have different widths WM from each other.

As shown in FIG. 3, the underlay portion 27 has a height H2 and the overlay portion 32 has a height H3. In the illustrated embodiment, the heights H2 and H3 are in a range of from about 4.0 inches (10.1 cm) to about 10.0 inches (25.4 cm). However, it should be understood that the heights H2 and H3 can be less than about 4.0 inches (10.1 cm) or more than about 10.0 inches (25.4 cm). It should also be understood that although the illustrated embodiment shows the heights H2 and H3 to be the same, in other embodiments, the heights H2 and H3 can be different from each other.

Referring again to FIG. 3, the underlay portion 27 and the overlay portion 32 overlay in an overlap region 83. The overlay region 83 has a height H4. In the illustrated embodiment, the height H4 of the overlay region is in a range of from about 2.0 inches (5.1 cm) to about 4.0 inches (10.2 cm). Alternatively, in other embodiments the height H4 can be less than about 2.0 inches (5.1 cm) or more than about 4.0 inches (10.2 cm).

As further shown in FIG. 3, the hip and ridge roofing shingles 24 have a headlap region 58 and a prime region 59. The headlap region 58 of the hip and ridge roofing shingles 24 is the portion of the hip and ridge roofing shingles 24 that is covered by successive overlapping hip and ridge roofing shingles 24 when the hip and ridge roofing shingles 24 are installed. The prime region 59 of the shingle blank 26 is the portion of the hip and ridge roofing shingles 24 that remains substantially exposed when the hip and ridge roofing shingles 24 are installed.

Referring again to FIG. 3, the height H1 of the shingle blank 26 may be divided between the headlap region 58 and the prime region 59 in any suitable proportion. In one embodiment, the height of the headlap region 58 can be approximately 2 inches (5.1 cm) greater than the height of the prime region 59. Alternatively, the height of the headlap region 58 can be more or less than 2 inches greater than the height of the prime region 59.

Referring again to FIG. 3, the perforations 82 extend through the various layers of the underlay portion 27 and the overlay portion 32. In other embodiments, the perforations 82 can extend through any desired layers of the underlay portion 27 and the overlay portion 32. The perforations 82 can be arranged in any suitable pattern to form the first and second perforation lines, 36 and 38.

In one example of a perforation pattern, the perforations 82 can be about 0.25 inches long and spaced apart from edge to edge by about 0.25 inches. In another embodiment of a perforation pattern, the perforations 82 can be about 0.50 inches long and spaced apart from edge to edge about 0.50 inches. Alternatively, the perforations 82 can be any suitable length and can be spaced apart edge to edge by any suitable length. The perforations 82 are configured such that an installer is able to separate the shingle blanks 26 into the hip and ridge roofing shingles 24 at the installation site. In the illustrated embodiment, the first and second perforation lines, 36 and 38, extend the full height H1 of the shingle blank 26. Alternatively, the first and second perforation lines, 36 and 38, can extend any height sufficient to enable an installer to separate the shingle blanks 26 into the hip and ridge roofing shingles 24 at an installation site. While the embodiment shown in FIG. 3 illustrates a quantity of two perforation lines, 36 and 38, it should be understood that more or less than two perforation lines, sufficient to enable an installer to separate the shingle blanks 26 into the hip and ridge roofing shingles 24, can be used.

Referring again to FIG. 3, the shingle blanks 26 arrive at the installation site having first and second perforation lines 36 and 38. During installation, the roofing installer separates the shingle blank 26 along the first and second perforation lines, 36 and 38 to form hip and ridge roofing shingles 24. The perforations 82 allow for the hip and ridge roofing shingles 24 to be formed from the shingle blanks 26 as the perforations 82 allow the various layers of the underlay portion 27 and the overlay portion 32 to be readily separated. The hip and ridge roofing shingles 24 have perforated edges 84. The configuration of the perforations 82 result in a perforated edge 84 which in some embodiments can be somewhat ragged. As one example, if the individual perforations 82 have a relatively long length or if a larger quantity of perforations 82 are used, then the perforation edges 84 are somewhat smoother. Conversely, if the individual perforations 82 have a relatively short length or if a fewer number of perforations 82 are used, then the perforation edges 84 are somewhat more ragged.

Referring again to FIG. 3, optionally a plurality of headlap courtesy cuts 60*a* extend from the leading edge 87 and a plurality of prime courtesy cuts 60*b* extend from the lower edge 31 of the underlay portion 27. In the illustrated embodiment, the headlap courtesy cuts 60*a* are configured to substantially align with a corresponding prime courtesy cut 60*b*, and the aligned headlap and prime courtesy cuts, 60*a* and 60*b*, are further aligned along the perforation lines, 36 and 38. As shown in the illustrated embodiment, the headlap courtesy cuts 60*a* and the prime courtesy cuts 60*b* extend substantially through the thickness of the shingle blank 26. In other embodiments, the courtesy cuts, 60*a* and 60*b*, can extend through any suitable layers of the shingle blank 26. The headlap and prime courtesy cuts, 60*a* and 60*b*, have a length. In the illustrated embodiment, the length of the headlap and prime courtesy cuts, 60*a* and 60*b*, is in a range of from about 1.0 inches to about 5.0 inches. In other embodiments, the length of the headlap and prime courtesy cuts, 60*a* and 60*b*, can be less than about 1.0 inches or more than about 5.0 inches. While the illustrated embodiment shows the headlap courtesy cuts 60*a* and the prime courtesy cuts 60*b* as being the same length, it should be understood that headlap courtesy cuts 60*a* and the prime courtesy cuts 60*b* can be different lengths.

As shown in FIG. 3, optionally a plurality of overlay courtesy cuts 61 are positioned in the overlay region 83 and extend substantially through the overlay portion 32 and the underlay portion 27. In the illustrated embodiment, the overlay courtesy cuts 61 are configured to substantially align with a corresponding prime courtesy cut 60*b*, and the aligned headlap and prime courtesy cuts, 60*a* and 60*b*, are further aligned along the perforation lines, 36 and 38. As shown in the illustrated embodiment, the overlay courtesy cuts 61 extend substantially through the layers of the overlay region 83. In other embodiments, the overlay courtesy cuts 61 can extend through any desired layers of the overlay region 83. The overlay courtesy cuts 61 have a length. In the illustrated embodiment, the length of the overlay courtesy cuts 61 is in a range of from about 1.0 inches to about 5.0 inches. In other embodiments, the length of the overlay courtesy cuts 61 can be less than about 1.0 inches or more than about 5.0 inches. While the illustrated embodiment shows the overlay courtesy cuts 61 as being the same length, it should be understood that the overlay courtesy cuts 61 can be different lengths.

The courtesy cuts, 60*a* and 60*b*, are configured to assist the installer in separating the shingle blanks 26. As will be explained below in more detail, the courtesy cuts, 60*a* and 60*b*, are provided in the shingle blank 26 during the manufacture of the shingle blank 26.

Referring again to FIG. 2, the hip and ridge roofing shingles 24 are installed in an overlapping manner on the ridge 18 and over the shingles 20. As a first installation step, an underlay portion 27 and the connected overlay portion 32 are cut from a hip and ridge roofing shingle 24 and fastened to the farthest downwind point on the ridge 18. As shown in FIG. 2, the direction of the prevailing wind in indicated by the arrow marked W. The overlay portion 32 can be fastened by any desired fastening method, such as for example, roofing nails (not shown). Next, a hip and ridge roofing shingle 24 is installed over the overlay portion 32 such that a portion of the hip and ridge roofing shingle 24 overlaps the overlay portion 32 and the leading edge 87 of the hip and ridge roofing shingle 24 is facing the wind direction W. The hip and ridge roofing shingle 24 is fastened to the ridge 18 in any desired manner. Additional hip and ridge roofing shingles 24 are installed in a similar fashion until the ridge 18 is covered.

Figure 6:
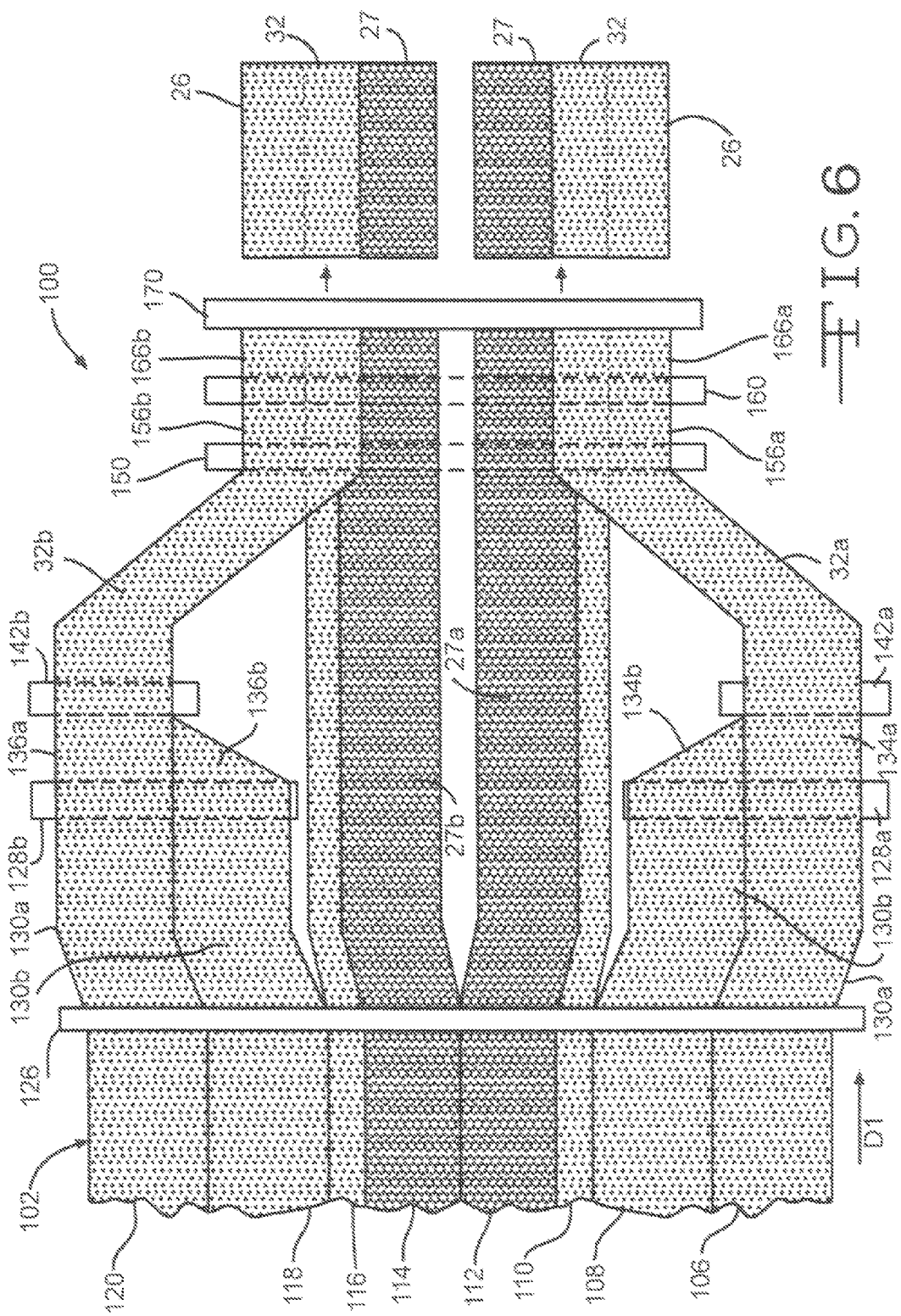
FIG. 6 is a plan view of an apparatus for manufacturing the shingle blank of FIG. 3.

Referring now to FIG. 6, an apparatus 100 for manufacturing shingle blanks 26 is illustrated. Generally, the manufacturing process involves passing a continuous sheet 102 in a machine direction (indicated by the arrow D1) through a series of manufacturing operations. In the illustrated embodiment, the sheet 102 usually moves at a speed of at least about 200 feet/minute (61 meters/minute), and typically at a speed within the range of between about 450 feet/minute (137 meters/minute) and about 800 feet/minute (244 meters/minute). The continuous sheet 102, however, may move at other desired speeds.

In the illustrated embodiment, the continuous sheet 102 has the same granule-covered, asphalt-coated substrate structure as the underlay portion 27 shown in FIG. 5 and as described above. However, the continuous sheet 102 can have other desired structure. The continuous sheet 102 can be manufactured with any desired manufacturing process.

The continuous sheet 102 includes a plurality of lanes 106, 108, 110, 112, 114, 116, 118 and 120. As will be explained in more detail below, the lanes 106 and 108 will be separated from the continuous sheet 102 and formed into a first overlay portion. The first overlay portion will then be adhered to a remaining portion of the continuous sheet to form the shingle blanks. Similarly, the lanes 118 and 120 will be separated from the continuous sheet 102 and formed into a second overlay portion. The second overlay portion will then be adhered to another remaining portion of the continuous sheet to form the shingle blanks.

In the illustrated embodiment, the lanes 106, 108, 110, 116, 118 and 120 are covered with headlap granules and will form the headlap region 58 of the hip and ridge roofing shingles 24 as shown in FIG. 3. The lanes 112 and 114 are covered with prime granules and will form the prime region 59 of the hip and ridge roofing shingles 24 as shown in FIG. 3.

Referring again to FIG. 6, in a first step of the illustrated manufacturing process, the continuous sheet 102 is fed in machine direction D1 through a cutting assembly 126. The cutting assembly 126 is configured to perform several manufacturing operations. First, the cutting assembly 126 is configured to form a perforation line (not shown) between lanes 106 and 108. Similarly, the cutting assembly 126 is configured to form a perforation line (not shown) between lanes 118 and 120. The perforation lines between lanes 106 and 108 and between lanes 118 and 120 are configured to facilitate folding of lanes 106 and 108 and folding of lanes 118 and 120 in downstream operations. Second, the cutting assembly 126 is configured to separate lanes 106 and 108 from the continuous sheet 102. Similarly, the cutting assembly 126 is configured to separate lanes 118 and 120 from the continuous sheet 102. Finally, the cutting assembly 126 is configured to separate lanes 112 and 114 from each other. As will be discussed in more detail below, lanes 112 and 114 will form underlay portion 27 as described above and shown in FIG. 3. In the illustrated embodiment, the cutting assembly 126 includes one or more cutting or perforation rollers. In other embodiments, the cutting assembly 126 can be other structures, mechanisms or devices configured to form perforations and separate lanes from the continuous sheet 102. After separation from the continuous sheet 102, lanes 106 and 108 form pre-folded lanes, 130a and 130b, and separated lanes 118 and 120 form pre-folded lanes 132a and 132b.

As shown in FIG. 6, lanes 110 and 112, now separated from the continuous sheet 102 form a first underlay portion 27a. Similarly, lanes 114 and 116, now separated from the continuous sheet 102 form a second underlay portion 27b. The pre-fold lanes 130a, 130b, 132a and 132b, and the first and second underlay portions 27a and 27b continue in machine direction D1.

In a next step of the manufacturing process, the pre-folded lanes 130a and 130b are fed through a first applicator 128a. Similarly, the pre-folded lanes 132a and 132b are fed through a second applicator 128b. The first and second applicators, 128a and 128b, are configured to apply the sealant bead 43, discussed above and shown in FIGS. 3 and 4, to a bottom surface of one of the pre-folded lanes 130a or 130b and one of the pre-folded lanes 132a or 132b. The first and second applicators, 128a and 128b, can be any suitable structure, mechanism, device or combination thereof configured for application of the sealant bead 43 to one of the pre-folded lanes 130a or 130b and one of the pre-folded lanes 132a or 132b. Application of the sealant beads 43 to the pre-folded lanes 130a or 130b and 132a or 132b forms beaded pre-folded lanes 134a, 134b, 136a and 136b. The beaded pre-folded lanes 134a, 134b, 136a and 136b and the first and second underlay portions 27a and 27b continue in machine direction D1.

The beaded pre-folded lanes 134a and 134b are fed through a first folder 142a. Similarly, the beaded pre-folded lanes 136a and 136b are fed through a second folder 142b. The first folder 142a is configured to bend or fold the beaded pre-folded lanes 134a and 134b about the perforation line between the beaded pre-folded lanes, 134a and 134b, thereby forming a first overlay portion 32a. Similarly, the second folder 142b is configured to bend or fold the beaded pre-folded lanes 136a and 136b about the perforation line between the beaded pre-folded lanes 136a and 136b, thereby forming a second overlay portion 32b. The first and second overlay portions, 32a and 32b, have the same structure as the overlay portion 32 discussed above and illustrated in FIG. 4. In the embodiment illustrated in FIG. 6, the first folder 142a includes at least one folding shoe (not shown) configured to fold the beaded pre-folded lanes 134a and 134b together such that the granule covered surfaces of beaded pre-folded lanes 134a and 134b are on the outer surfaces of the first overlay portion 32a. Similarly, the second folder 142b includes at least one folding shoe (not shown) configured to fold beaded pre-folded lanes 136a and 136b together such that the granule covered surfaces of beaded pre-folded lanes 136a and 136b are on the outer surfaces of the second overlay portion 32b. While the first and second folders, 142a and 142b, have been described above an having at least one folding shoe, it should be understood that in other embodiments, the first and second folders, 142a and 142b, can be other structures, mechanisms, devices or combinations thereof, sufficient to bend or fold the beaded pre-folded lanes 134a, 134b and 136a, 136b into first and second overlay portions 32a and 32b.

As described above, the first and second folders, 142a and 142b, fold the beaded pre-folded lanes 134a, 134b and 136a, 136b into first and second overlay portions 32a and 32b. The first and second overlay portions, 32a and 32b, and the first and second underlay portions, 27a and 27b, advance in machine direction D1.

Referring again to FIG. 6, the first overlay portion 32a is fed through a third applicator 150. The third applicator 150 is configured for several manufacturing operations. First, the third applicator 150 is configured to adhere the first overlay portion 32a to a portion of the first underlay portion 27a using the adhesive 80 illustrated in FIG. 5 and described above. Similarly, the third applicator 150 is configured to adhere the second overlay portion 32b to a portion of the second underlay portion 27b using the adhesive 80. The third applicator 150 can be any suitable structure, mechanism, device or combination thereof configured for adhesion of the first and second overlay portions, 32a and 32b, to a portion of the first and second underlay portions 27a and 27b. Application of the first and second overlay portions, 32a and 32b, to the first and second underlay portions, 27a and 27b, forms first and second applied sheets, 156a and 156b. Applied sheet 156a includes lanes 110 and 112 and adhered first overlay portion 27a. Similarly, applied sheet 156b includes lanes 114 and 116 and adhered second overlay portion 27b.

In a next manufacturing operation as shown in FIG. 6, the first and second applied sheets, 156a and 156b, are fed through a fourth applicator 160. The fourth applicator 160 is configured to apply an optional sealant bead 162 to a portion of the lower surface 29 of the shingle blank 26 as shown in FIG. 3. In one embodiment, the sealant bead 162 can be the same as, or similar to, the sealant bead 43 illustrated in FIG. 4 and described above. However, the sealant bead 162 can be different.

Figure 8:
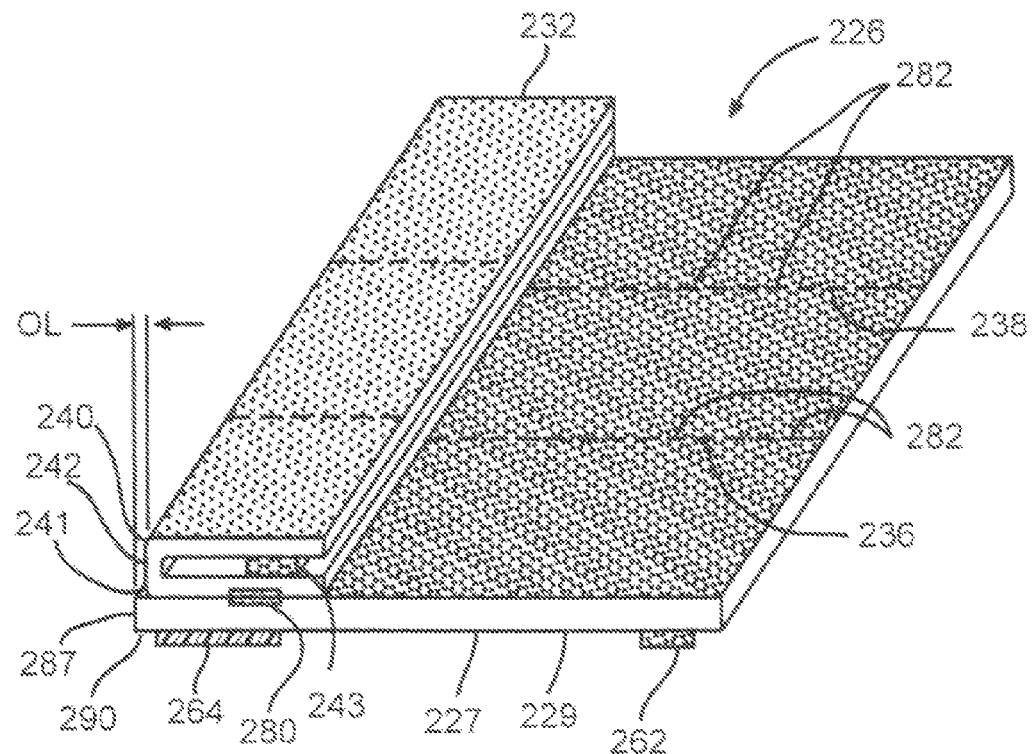
FIG. 8 is a perspective view of a second embodiment of a shingle blank incorporating the overlay portion of FIG. 7.

Referring again to FIG. 6, the fourth applicator 160 is also configured to apply an optional release tape 164 to a portion of a lower surface of the overlay portion 32 as shown in FIG. 8. The release tape 164 is positioned on the lower surface of the overlay portion 32 in a location suitable to cover the optional sealant line 162 as the shingle blanks 26 are stacked for storage or shipping. In the illustrated embodiment, the release tape 164 is made of a polymeric material. In other embodiments, the release tape 164 can be made of other desired materials or combinations of materials. In still other embodiments, the release tape 164 can have desired coatings. The release tape 164 can have any configuration, orientation and dimensions suitable to cover the optional sealant line 162 as the shingle blanks 26 are stacked for storage or shipping. However, configuring the shingle blank 26 to include a release tape 164 is optional and not necessary for the use of the shingle blank 26.

Application of the optional sealant bead 162 and the optional release tape 164 to the first and second applied sheets, 156a and 156b, forms first and second pre-cut sheets 166a and 166b. The first pre-cut sheet 166a includes lanes 110 and 112 of the underlay portion 27a, adhered first overlay portion 32a, optional sealant bead 162 and optional release tape 164. Similarly, the second pre-cut sheet 166b includes lanes 114 and 116 of the underlay portion 27b, adhered second overlay portion 32b, optional sealant bead 162 and optional release tape 164.

The first and second pre-cut sheets, 166a and 166b, are passed through a cutting mechanism 170. The cutting mechanism 170 is configured to perform several manufacturing operations. First, the cutting mechanism 170 is configured to form perforation lines, 36 and 38, having perforations 82 as described above and illustrated in FIG. 3. The cutting mechanism 170 can form the perforation 82 in any desired manner. Second, the cutting mechanism 170 is configured to cut the first and second pre-cut sheets, 166a and 166b, thereby forming the individual shingle blanks 26. The shingle blanks 26 have the underlay portion 27 and the overlay portion 32. While FIG. 6 illustrates one example of an apparatus 170 configured for forming the perforations 82 and cutting the individual shingle blanks 26, it should be understood that other suitable mechanisms or combinations of mechanisms can be used.

The shingle blanks 26 can be collected and packaged such that the release tape 164 positioned on the lower surface of the overlay portion 32 covers the optional sealant line 162 located on the lower surface 29 of a subsequent shingle blank 26. While the embodiment shown in FIG. 6 illustrates the perforating and cutting processes as a single process, it is within the contemplation of this invention that the perforating and cutting processes can be completed at different times and by different apparatus.

While the apparatus 100 is shown and described in terms of a continuous process, it should be understood that the manufacturing method can also be practiced in a batch process using discreet lengths of materials instead of continuous sheets.

While the embodiment illustrated in FIGS. 3-6 describe an overlay portion having a substantially flattened U-shaped cross-sectional shape and positioned to overlap a portion of the underlay sheet, in other embodiments, the overlay portion can have other cross-sectional shapes and can be positioned in other locations on the underlay sheet.

Figure 7:
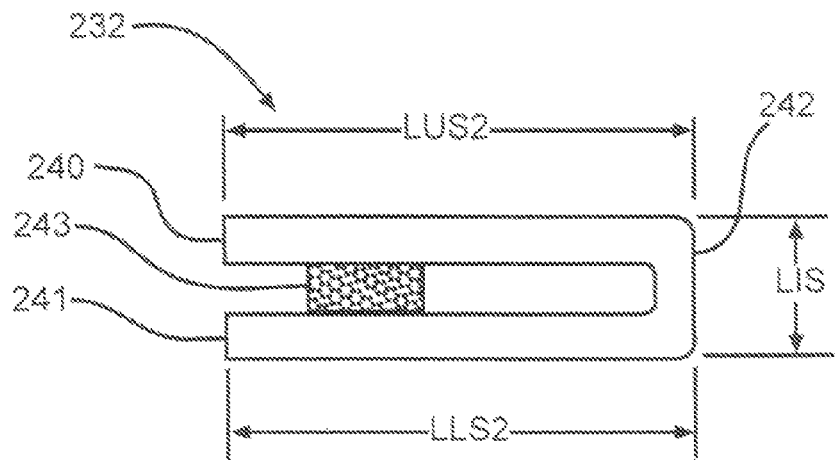
FIG. 7 is a side view in elevation of a second embodiment of an overlay portion.

Referring now to FIG. 7, a second embodiment of an overlay portion 232 is illustrated. The overlay portion 232 includes an upper segment 240, a lower segment 241 and an intermediate segment 242. In the illustrated embodiment, the upper segment 240 and the lower segment 241 are the same as, or similar to, the upper segment 40 and the lower segment 41 described above and illustrated in FIG. 4. Alternatively, the upper segment 240 and the lower segment 241 can be different from the upper segment 40 and the lower segment 41. The intermediate segment 242 is formed from the same continuous substrate coated with an asphalt coating subsequently coated with granules as forms the upper and lower segments, 240 and 241. In the embodiment shown in FIG. 7, the upper segment 240, lower segment 241 and intermediate segment 242 of the overlay portion 232 combine to form a U-shaped cross-sectional shape. However, the overlay portion 232 can form other desired cross-sectional shapes.

Referring again to FIG. 7, a sealant bead 243 is positioned between the upper segment 240 and the lower segment 241. In the illustrated embodiment, the sealant bead 243 is the same as or similar to the sealant bead 43 described above and illustrated in FIG. 4. In other embodiments, the sealant bead 243 can be different from the sealant bead 43.

As shown in FIG. 7, the upper segment 240 has a length LUS2, the lower segment 241 has a length LLS2, and the intermediate segment 242 has a length LIS. In the illustrated embodiment, the lengths LUS2 and LLS2 of the upper and lower segments, 240 and 241 respectively, are approximately 4.0 inches and the length LIS of the intermediate segment 242 is approximately 0.50 inches. However, in other embodiments, the lengths LUS2, LLS2 and LIS can be different. While the lengths LUS2 and LLS2 are shown in the current embodiment as being the same, it should be appreciated that the lengths LUS2 and LLS2 can be different from each other.

As discussed above, the overlay portion 232 can be positioned on an underlay portion in any desired location. FIG. 8 illustrates one embodiment of the positioning of the overlay portion 232 on an underlay portion 227, thereby forming shingle blank 226. The shingle blank 226 includes the overlay portion 232 adhered to the underlay portion 227. An optional sealant bead 262 and an optional release tape 264 are positioned on a lower surface 229 of the underlay portion 227. As further shown in FIG. 8, the shingle blank 226 includes first and second perforation lines 236 and 238 and a leading edge 287. The overlay portion 232 includes a sealant bead 243 positioned between the upper segment 240, the lower segment 241 and the intermediate segment 242. In the illustrated embodiment, the optional sealant bead 262, optional release tape 264, lower surface 229, and first and second perforation lines, 236 and 238, are the same as, or similar to the optional sealant bead 162, optional release tape 164, lower surface 29, and first and second perforation lines, 36 and 38, discussed above and illustrated in FIG. 3. However, the optional sealant bead 262, optional release tape 264, lower surface 229, and first and second perforation lines, 236 and 238, can be different from the optional sealant bead 162, optional release tape 164, lower surface 29, and first and second perforation lines, 36 and 38.

Referring again to FIG. 8, the overlay portion 232 is offset from the leading edge 287 of the shingle blank 226 thereby forming an offset segment 290. The offset segment has an offset length OL. In the illustrated embodiment, the offset length OL is in a range of from about 0.25 inches to about 2.0 inches. In other embodiments, the offset length OL can be less than about 0.25 inches or more than about 2.00 inches. The offset segment 290 is configured to provide an additional shingle layer under subsequent overlapping hip and ridge shingle shingles 24 as shown in FIG. 2. While the embodiment illustrated in FIG. 8 illustrates the overlay portion 232 as being positioned substantially adjacent to the leading edge 287 of the shingle blank 226, it should be appreciated that the overlay portion 232 can be positioned in any desired location on the underlay portion 227, such as the non-limiting example of the center of the underlay portion 227.

The shingle blank 226 having the underlay portion 227 and the overlay portion 232 illustrated in FIG. 8 can be manufactured and installed using the same manufacturing and installation processes described above and illustrated in FIGS. 2 and 6. In other embodiments, the shingle blank 226, underlay portion 227 and the overlay portion 232 can be manufactured or installed using other manufacturing or installation processes.

While the lower segments 41 and 241 of the overlay portions 32 and 232 described above and illustrated in FIGS. 4 and 7 are formed from a continuous granule and asphalt coated substrate, it should be appreciated that in other embodiments, the lower segment can include cutouts advantageously configured to reduce the weight of the hip and ridge shingles.

Figure 9:
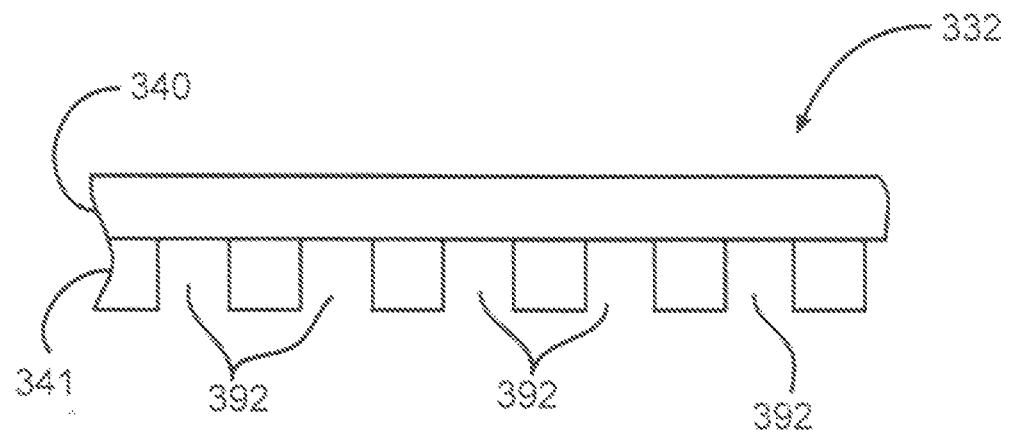
FIG. 9 is a plan view of a third embodiment of an overlay portion illustrated in a pre-folded condition.
Figure 10:
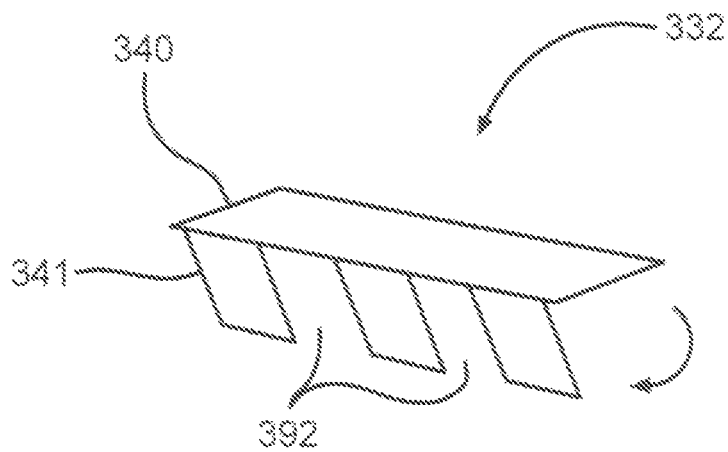
FIG. 10 is a perspective view of the overlay portion of FIG. 9 illustrating the folding of the overlay portion.

Referring now to FIGS. 9 and 10 another embodiment of an overlay portion 332 is illustrated. The overlay segment 332 includes an upper segment 340 and a lower segment 341. The lower segment 341 includes a plurality of cutout portions 392. As shown in FIG. 9, the upper segment 340 and the lower segment 341 having the cutout portions 392 are folded together thereby forming the overlay portion 332. In the illustrated embodiment, the overlay portion 332 is the same as, or similar to, the overlay portion 32 illustrated in FIG. 3 and described above. The cutouts 392 advantageously reduce the material weight of the resulting shingle blanks, thereby reducing shipping and handling costs. While the cutouts 392 illustrated in FIGS. 9 and 10 have a rectangular shape and are equally spaced apart, it should be appreciated that the cutouts 392 can have other desired shapes and can have any desired spacing.

Referring now to FIG. 11, an apparatus 400 for manufacturing shingle blanks 26 having overlay portions with cutouts is illustrated. Generally, the manufacturing process illustrated in FIG. 11 is the same as, or similar to the manufacturing process illustrated in FIG. 6 with the additional operation of forming the cutouts in the lower segments of the overlay portions.

In the illustrated embodiment, the continuous sheet 402 has the same granule-covered, asphalt-coated substrate structure as the continuous sheet 102 shown in FIG. 6 and as described above. However, the continuous sheet 402 can have other desired structure.

The continuous sheet 402 includes a plurality of lanes 405, 406, 408, 410, 412, 414 and 415. As will be explained in more detail below, lane 410 will be formed into mating cutouts, which when combined with lanes 408 and 412 will form overlay portions. The overlay portions will be adhered to underlay portions to form the shingle blanks.

In the illustrated embodiment, lanes 406, 408, 410, 412 and 414 are covered with headlap granules and will form the headlap region 58 of the hip and ridge roofing shingles 24 as shown in FIG. 3. Lanes 405 and 415 are covered with prime granules and will form the prime region 59 of the hip and ridge roofing shingles 24 as shown in FIG. 3.

Referring again to FIG. 11, in a first step of the illustrated manufacturing process, the continuous sheet 402 is fed in machine direction D401 through an applicator 480. The applicator 480 is configured to apply registration marks (not shown) to a portion of the lanes 408 and 412 in any desired location relative to mating cutouts in lane 410 and in a direction generally perpendicular to the machine direction D401. For example, in one embodiment, the registration marks can indicate the center of a cutout. In other embodiments, the registration marks can indicate the center of a tooth. In still other embodiments, the registration marks can indicate any portion of a cutout or a tooth. The applicator 480 can be any desired structure, device or mechanism sufficient to apply registration marks to the lanes 408 and 412. The registration marks can be applied in any desired configuration including the non-limiting examples of a series of spots or discontinuous lines. In some embodiments, the registration marks can be paint. However, other forms of registration marks can be used. In still other embodiments, the registration marks can be used to indicate a nailing line for the formed shingle blanks. As will be discussed in more detail below, the registration marks are configured for use as a timing registration in downstream operations. Application of the registration marks to the lanes 408 and 412 forms marked sheet 482.

The marked sheet 482 is then fed in machine direction D401 through a reader 484. The reader 484 is configured to read the location of the registration marks applied to lanes 408 and 412 relative to the mating cutouts. The reader 484 can be any desired structure, device or mechanism sufficient to read the location of registration marks on the marked sheet. In one embodiment, the reader 484 is an infrared sensor. However, other readers can be used. As will be explained in more detail below, the reader 484 retains the read information for use in downstream operations. Reading of the marked sheet 482 by the reader 484 forms read sheet 486.

Referring again to FIG. 11, in a next step of the illustrated manufacturing process, the read sheet 486 is fed in machine direction D401 through a cutting assembly 426. The cutting assembly 426 is configured to perform several manufacturing operations. First, the cutting assembly 426 is configured to form a plurality of mating cutouts 492 in lane 410. The cutouts 492 are the same as or similar to the cutouts 392 described above and illustrated in FIGS. 9 and 10. Second, the cutting assembly 426 is configured to form a perforation line (not shown) between lane 408 and the material remaining in lane 410. Similarly, the cutting assembly 426 is configured to form a perforation line (not shown) between lane 412 and the material remaining in lane 410. The perforation line between lane 408 and the material remaining in lane 410 is configured to facilitate folding of lane 408 with the material remaining in lane 410 in downstream operations. Similarly, the perforation line between lane 412 and the material remaining in lane 410 is configured to facilitate folding of lane 412 with the material remaining in lane 410 in downstream operations. Finally, the cutting assembly 426 is configured to separate the combined lanes 405 and 406 from the read sheet 486. Similarly, the cutting assembly 426 is configured to separate the combined lanes 414 and 415 from the read sheet 486. As will be discussed in more detail below, lanes 405 and 406 and lanes 414 and 415 will form underlay portion 227 as described above and shown in FIG. 8. In the illustrated embodiment, the cutting assembly 426 is the same as or similar to the cutting assembly 126 described above and illustrated in FIG. 6. However, the cutting assembly 426 can be different from the cutting assembly 126. After formation of the mating cutouts 492 and after separation from the continuous sheet 402, lanes 408 and 410 form pre-folded lanes, 430a and 430b, and separated lanes 410 and 412 form pre-folded lanes 432a and 432b.

As shown in FIG. 11, lanes 405 and 406, now separated from the continuous sheet 402 form a first underlay portion 427a. Similarly, lanes 415 and 415, now separated from the continuous sheet 402 form a second underlay portion 427b. The pre-fold lanes 430a, 430b, 432a and 432b, and the first and second underlay portions 427a and 427b continue in machine direction D401.

In a next step of the manufacturing process, the pre-folded lanes 430a and 430b are fed through an applicator 428. Similarly, the pre-folded lanes 432a and 432b are fed through the applicator 428. The applicator 428 is configured to apply the sealant bead 243, discussed above and shown in FIGS. 7 and 8, to a bottom surface of one of the pre-folded lanes 430a or 430b and one of the pre-folded lanes 432a or 432b. In the illustrated embodiment, the applicator 428 is the same as or similar to the applicators 128a and 128b described above and illustrated in FIG. 6. Alternatively, the applicator 428 can be different from the applicators 128a and 128b. Application of the sealant beads to the pre-folded lanes 430a or 430b and 432a or 432b forms beaded pre-folded lanes 434a, 434b, 436a and 436b. The beaded pre-folded lanes 434a, 434b, 436a and 436b and the first and second underlay portions 427a and 427b continue in machine direction D1.

The beaded pre-folded lanes 434a and 434b are fed through a folder 442. Similarly, the beaded pre-folded lanes 436a and 436b are fed through the folder 442. The folder 442 is configured to bend or fold the beaded pre-folded lanes 434a and 434b about the perforation line between the beaded pre-folded lanes, 434a and 434b, thereby forming a first overlay portion 438a. Similarly, the folder 442 is configured to bend or fold the beaded pre-folded lanes 436a and 436b about the perforation line between the beaded pre-folded lanes 436a and 436b, thereby forming a second overlay portion 438b. The first and second overlay portions, 438a and 438b, have the same structure as the overlay portion 232 discussed above and illustrated in FIGS. 7 and 8. In the embodiment illustrated in FIG. 11, folder 442 is the same as or similar to the folders 142a and 142b discussed above and illustrated in FIG. 6. In other embodiments, the folder 442 can be different from the folders 142a and 142b. The first and second overlay portions, 438a and 438b, and the first and second underlay portions, 427a and 427b, advance in machine direction D401.

Referring again to FIG. 11, the first overlay portion 438a and the first underlay portion 427a are fed through applicator 450a. Applicator 450a is configured to adhere the first overlay portion 438a to a portion of the first underlay portion 427a using the adhesive 80 illustrated in FIG. 3 and described above. Similarly, the second overlay portion 438b and the second underlay portion 427b are fed through applicator 450b. Applicator 450b is configured to adhere the second overlay portion 438b to a portion of the second underlay portion 427b using the adhesive 80. In the illustrated embodiment, the applicators, 450a and 450b, are the same as or similar to the applicator 150 described above and illustrated in FIG. 11. However, the applicators 450a and 450b can be different from the applicator 150. Application of the first and second overlay portions, 438a and 438b, to the first and second underlay portions, 427a and 427b, forms first and second applied sheets, 456a and 456b.

In additional downstream operations, optional sealant beads and optional release tapes can be applied to the first and second applied sheets 456a and 456b by the applicator 460. In the illustrated embodiment, the optional sealant beads and the optional release tapes are the same as, or similar to, the sealant bead 262 and the release tape 264 described above and illustrated in FIG. 8. In other embodiments, the optional sealant beads and the optional release tapes can be different from the sealant bead 262 and the release tape 264. In one embodiment, the applicator 460 is the same as or similar to the fourth applicator 160 as illustrated in FIG. 6 and described above. In other embodiments, the applicator 460 can be different from the fourth applicator 160.

Application of the optional sealant bead and the optional release tape to the first and second applied sheets, 456a and 456b, form first and second pre-cut sheets 466a and 466b.

The first and second pre-cut sheets, 466a and 466b, are passed through a reader 488. The reader 488 is configured to confirm the location of the registration marks, applied by the applicator 480 to lanes 408 and 412 and read previously by the reader 484, relative to the mating cutouts. Reading of the first and second pre-cut sheets, 466a and 466b, forms read first and second pre-cut sheets 490a and 490b. The reader 488 can be the same as, or similar to the reader 484 discussed above. Alternatively, the reader 488 can be different from the reader 484.

The read first and second pre-cut sheets, 490a and 490b, are passed through a cutting mechanism 470. The cutting mechanism 470 is configured to perform several manufacturing operations. First, the cutting mechanism 470 is configured to form perforation lines, 236 and 238, having perforations 282 as described above and illustrated in FIG. 8. Second, the cutting mechanism 470 is configured to cut the read first and second pre-cut sheets, 490a and 490b, thereby forming the individual shingle blanks 426a and 427b. The cutting mechanism 470 uses information provided by the reader 488 as to the location of the mating cutouts. The cutting mechanism 470 can be configured to cut the read first and second pre-cut sheets, 490a and 490b, such that the cuts occur at any desired location along any cutout or at any desired location between any cutout. In this manner, the cutting of the individual shingle blanks 426a and 427b is synchronized by the reader 488. In the illustrated embodiment, the cutting mechanism 470 is the same as or similar to the cutting mechanism 170 described above and illustrated in FIG. 6. Alternatively, the cutting mechanism 470 can be different from the cutting mechanism 170.

In the embodiment illustrated in FIG. 11, the shingle blanks 426a and 426b are collected and packaged as described above. In other embodiments, the shingle blanks 426a and 426b can be collected and packaged in other desired manners. One non-limiting example of stacking the shingle blanks, 426a and 426b, includes flipping alternate shingle blanks such that a face of one shingle blank is in contact with the face of a subsequent shingle blank and the back of the subsequent shingle blank is in contact with the back of the next shingle blank. While the embodiment shown in FIG. 11 illustrates the perforating and cutting processes as a single process, it is within the contemplation of this invention that the perforating and cutting processes can be completed at different times and by different apparatus.

While the apparatus 400 is shown and described in terms of a continuous process, it should be understood that the manufacturing method can also be practiced in a batch process using discreet lengths of materials instead of continuous sheets.

While the embodiment illustrated in FIG. 11 uses the applicator 480 to provide registration marks, it should be appreciated that the cutting of the shingle blanks 426a and 426b can be synchronized with other methods, including the non-limiting example of using registration cutouts in the headlap lanes 408 and 410.

The principle and mode of operation of this invention have been described in certain embodiments. However, it should be noted that this invention may be practiced otherwise than as specifically illustrated and described without departing from its scope.

What is claimed is:
1. A shingle blank comprising:
an underlay portion having a substrate coated with an asphalt coating and granules, the underlay portion having an upper edge and a lower edge;
a separate overlay portion adhered to the underlay portion, the overlay portion comprising a substrate coated with an asphalt coating and granules and having more than one layered segment, at least one of the layered segments being folded over on top of at least one of the other layered segments, each of the layered segments connected together by a common substrate, the layered segments having a sealant bead forming an adhesive seal therebetween, wherein the entirety of the overlay portion is disposed on an upper surface of the underlay portion; and
a plurality of perforation lines extending in a substantially perpendicular direction from an upper edge of the overlay portion to the lower edge of the underlay portion;
wherein the plurality of perforation lines are sufficient to facilitate separation of the shingle blank to form hip and ridge roofing shingles configured for application across a ridge or hip.

2. The shingle blank of claim 1, wherein the overlay portion includes an upper segment and a lower segment.

3. The shingle blank of claim 2, wherein the upper segment has a length and the lower segment has a length, wherein the length of the upper segment is the same as the length of the lower segment.

4. The shingle blank of claim 2, wherein the lower segment of the overlay portion includes cutouts.

5. The shingle blank of claim 1, wherein the entirety of the overlay portion is disposed on an upper surface of the underlay portion when the hip and ridge roofing shingle is in an installed state on a roof.

6. The shingle blank of claim 1, wherein the overlay portion includes an upper segment, a lower segment and an intermediate segment.

7. The shingle blank of claim 6, wherein the upper segment, lower segment and intermediate segment combine to form a U-shaped cross-sectional shape.

8. The shingle blank of claim 6, wherein the upper segment has a length and the lower segment has a length, wherein the length of the upper segment is the same as the length of the lower segment.

9. The shingle blank of claim 6, wherein the lower segment of the overlay portion includes cutouts.

10. The shingle blank of claim 9, wherein the cutouts have a rectangular shape and are equally spaced apart.

11. The shingle blank of claim 1, wherein the overlay portion is positioned at one end of the underlay portion.

12. The shingle blank of claim 11, wherein the overlay portion is offset from a leading edge of the underlay portion.

13. The shingle blank of claim 12, wherein the overlay portion is offset from the leading edge of the underlay portion by a maximum distance of about 2 inches.

14. The shingle blank of claim 1, wherein a release tape is applied to a portion of a lower surface of the underlay portion.

15. The shingle blank of claim 14, wherein a sealant bead is applied to a portion of the lower surface of the underlay portion.

16. The shingle blank of claim 1, wherein an adhesive material is disposed between a lower surface of the overlay portion and the upper surface of the underlay portion.

17. A shingle blank comprising:
   an underlay portion having a substrate coated with an asphalt coating and granules, the underlay portion having an upper edge and a lower edge;
   a separate overlay portion adhered to the underlay portion, wherein the overlay portion comprises a substrate coated with an asphalt coating and granules and is folded over on itself to form more than one layered segment, each of the layered segments connected together by a common substrate, the layered segments having a sealant bead forming an adhesive seal therebetween, wherein the entirety of the overlay portion is disposed on an upper surface of the underlay portion; and
   a plurality of perforation lines extending in a substantially perpendicular direction from an upper edge of the overlay portion to the lower edge of the underlay portion;
   wherein the plurality of perforation lines are sufficient to facilitate separation of the shingle blank to form hip and ridge roofing shingles configured for application across a ridge or hip.

18. The shingle blank of claim 17, wherein the overlay portion includes an upper segment and a lower segment.

19. The shingle blank of claim 18, wherein the upper segment has a length and the lower segment has a length, wherein the length of the upper segment is the same as the length of the lower segment.

20. The shingle blank of claim 17, wherein the overlay portion includes an upper segment, a lower segment and an intermediate segment.

21. The shingle blank of claim 20, wherein the upper segment, lower segment and intermediate segment combine to form a U-shaped cross-sectional shape.

22. The shingle blank of claim 21, wherein the upper segment has a length and the lower segment has a length, wherein the length of the upper segment is the same as the length of the lower segment.

23. The shingle blank of claim 17, wherein the overlay portion is positioned at one end of the underlay portion.

24. The shingle blank of claim 23, wherein the overlay portion is offset from a leading edge of the underlay portion.

25. The shingle blank of claim 24, wherein the overlay portion is offset from the leading edge of the underlay portion by a maximum distance of about 2 inches.

26. The shingle blank of claim 17, wherein the entirety of the overlay portion is disposed on an upper surface of the underlay portion when the hip and ridge roofing shingle is in an installed state on a roof.

27. The shingle blank of claim 17, wherein a release tape is applied to a portion of a lower surface of the underlay portion.

28. The shingle blank of claim 17, wherein a sealant bead is applied to a portion of the lower surface of the underlay portion.

29. The shingle blank of claim 17, wherein an adhesive material is disposed between a lower surface of the overlay portion and the upper surface of the underlay portion.

30. A shingle blank comprising:
   an underlay portion having a substrate coated with an asphalt coating and granules, the underlay portion having an upper edge and a lower edge;
   a separate overlay portion adhered to the underlay portion, wherein the overlay portion comprises a substrate coated with an asphalt coating and granules and is folded over on itself to form more than one layered segment, each of the layered segments connected together by a common substrate, the layered segments having a sealant bead forming an adhesive seal therebetween, the entirety of the overlay portion is disposed on an upper surface of the underlay portion; and
   a plurality of perforation lines extending in a substantially perpendicular direction from an upper edge of the overlay portion to the lower edge of the underlay portion;
   wherein the plurality of perforation lines are sufficient to facilitate separation of the shingle blank to form hip and ridge roofing shingles configured for application across a ridge or hip; and
   wherein the overlay portion is offset from a leading edge of the underlay portion.

* * * * *